US009296086B2

United States Patent
Chang et al.

(10) Patent No.: US 9,296,086 B2
(45) Date of Patent: Mar. 29, 2016

(54) DESTRUCTIVE AND VISUAL MEASUREMENT AUTOMATION SYSTEM FOR WEB THICKNESS OF MICRODRILLS AND METHOD THEREOF

(71) Applicant: National Taiwan Ocean University, Keelung (TW)

(72) Inventors: Wen-Tung Chang, Taipei (TW); Yu-Yun Lu, Taipei (TW)

(73) Assignee: National Taiwan Ocean University, Keelung (TW)

( * ) Notice: Subject to any disclaimer, the term of this patent is extended or adjusted under 35 U.S.C. 154(b) by 209 days.

(21) Appl. No.: 14/254,652

(22) Filed: Apr. 16, 2014

(65) Prior Publication Data

US 2015/0017879 A1 Jan. 15, 2015

(30) Foreign Application Priority Data

Jul. 12, 2013 (TW) .............................. 102125098 A

(51) Int. Cl.
*B24B 49/12* (2006.01)
*G06T 7/00* (2006.01)
(Continued)

(52) U.S. Cl.
CPC . *B24B 49/12* (2013.01); *B24B 3/24* (2013.01); *B24B 19/00* (2013.01); *G06T 7/0004* (2013.01); *B23B 2251/426* (2013.01); *G06T 2207/30164* (2013.01)

(58) Field of Classification Search
CPC .... B24B 49/12; B24B 3/24; B23B 2251/426; G06T 7/0004; G06T 2207/30164
USPC ................................................ 451/6, 5, 48
See application file for complete search history.

(56) References Cited

U.S. PATENT DOCUMENTS 6,283,824 B1 * 9/2001 Mortell .................. B23B 51/02
451/339
6,419,562 B1 * 7/2002 D'Ambra .................. B24B 3/26
451/11

(Continued)

FOREIGN PATENT DOCUMENTS

TW        I254124 B    5/2006
TW        I413756 B    11/2013

OTHER PUBLICATIONS

Chang, Wen-Tung et al., A vision-aided automation system for destructive web thickness measurement of microdrills, Int J Adv Manuf Technol, 2013, pp. 1-21, DOI:10.1007/s00170-013-5509-5.

(Continued)

*Primary Examiner* — Robert Rose
(74) *Attorney, Agent, or Firm* — Muncy, Geissler, Olds & Lowe, P.C.

(57) ABSTRACT

An improved destructive and visual measurement automation system and a method for measuring a web thickness of a microdrill are provided. When a dual-axis motion platform module moves the microdrill to a first position, a reflection module reflects a first image in a first direction toward a second direction. A vision module receives the reflected first image in the second direction and outputs the received first image to a computer. According to the first image, the computer performs a positioning procedure and a grinding procedure to drive a drill grinding module to grind the microdrill to a sectional position to be measured of the microdrill. When the microdrill is moved to a second position, the vision module outputs a second image to the computer. According to the second image, the computer performs an image computing procedure to obtain the web thickness at the sectional position to be measured.

10 Claims, 23 Drawing Sheets

(51) Int. Cl.
*B24B 3/24* (2006.01)
*B24B 19/00* (2006.01)

(56) References Cited

U.S. PATENT DOCUMENTS 6,878,035 B2* 4/2005 Varney ............... B24B 3/24
 450/11
2012/0236139 A1* 9/2012 Chang ............... G01B 11/02
 348/88

OTHER PUBLICATIONS

Chang, Wen-Tung et al., An Optical-Based Method and System for the Web Thickness Measurement of Microdrills Considering Runout Compensation, *International Journal of Precision Engineering and Manufacturing*, 2013, vol. 14, No. 5, pp. 725-734.

Chuang, Shui-Fa et al., Nondestructive web thickness measurement of micro-drills with an integrated laser inspection system, *Nondestructive Testing and Evaluation*, Sep. 2010, vol. 25, No. 3, pp. 249-266.

* cited by examiner

DESTRUCTIVE AND VISUAL MEASUREMENT AUTOMATION SYSTEM FOR WEB THICKNESS OF MICRODRILLS AND METHOD THEREOF

CROSS-REFERENCE TO RELATED APPLICATIONS

This non-provisional application claims priority under 35 U.S.C. §119(a) on Patent Application No(s). 102125098 filed in Taiwan on Jul. 12, 2013, the entire contents of which are hereby incorporated by reference.

TECHNICAL FIELD

The disclosure relates to a destructive and visual measurement system for measuring a web thickness of a microdrill, and a method thereof, more particularly to an improved destructive and visual measurement automation system for measuring a web thickness of a microdrill, and a method thereof.

BACKGROUND

Microdrills nowadays have widely been applied to drill micro-holes in various printed circuit boards (PCB). Referring to FIG. 1A to FIG. 1C, the details of a microdrill 50 are described, where FIG. 1A is a schematic lateral view of a microdrill according to an embodiment, FIG. 1B is a sectional view of the microdrill in FIG. 1A along a section-line 1B-1B, and FIG. 1C is a sectional view of the microdrill in FIG. 1A along a section-line 1C-1C. The microdrill 50 is, for example, a standard type drill (ST type drill or called straight type drill), has a central axis 51, and includes a shank 52 and a drill body 54. The drill body 54 includes a drill point 60, helical flutes 58, and a drill tip 60a. The drill body 54 is magnified in scale relative to the shank 52 for ease of illustration. The drill body 54 is composed of the drill point 60 and the helical flutes 58 in function. The drill point 60 is used to produce a drilling action, and the helical flutes 58 are used to remove chips.

In the drill body 54, there is a conical, core which has not been fluted and is called drill web 56, and the thickness of the drill web 56 (called the web thickness 62 hereinafter) conflict with a depth of the helical flute 58 in design. The microdrill 50 with a larger web thickness 62 can lead to good drill rigidity while the depth of the helical flute 58 is smaller, thus resulting in poor chip-removal ability. On the contrary, the helical flute 58 with a larger depth can lead to good chip-removal ability while the drill rigidity thereof is lower. Therefore, the web thickness 62 is a key parameter influencing quality of the microdrill 50. The measurement of the web thickness of microdrill products for improving manufacturing parameters is an important quality management task that microdrill manufacturers concern.

On the other hand, microdrills may be undercut type drills (UC type drills). Referring to FIG. 1D to FIG. 1F, the details of a UC type microdrill 50' are described, where FIG. 1D is a schematic lateral view of a microdrill according to an embodiment, FIG. 1E is a sectional view of the microdrill in FIG. 1D along a section-line 1E-1E, and FIG. 1F is a sectional view of the microdrill in FIG. 1D along a section-line 1F-1F. The microdrill 50' includes a shank 52' and a drill body 54'. The drill body 54' includes a drill point 60', helical flutes 58', and a drill tip 60a'. For the microdrill 50', the drill body 54' is ground to yield a UC diameter, i.e. the external diameter of the section along the section-line 1F-1F, which is smaller than the drill diameter, i.e. the external diameter of the section along the section-line 1E-1E. Therefore, during the duration of drilling, the microdrill 50' can effectively reduce the contact area between the drill body 54' and the wall of a drilled hole, thereby reducing the heat generated during drilling, and enhancing the quality of the drilled hole. Such a microdrill 50' is quite suitable to the drilling task for multi-layered PCBs.

In view of FIG. 1C, FIG. 1E and FIG. 1F, the sectional contour of the ST type microdrill 50 is different from that of the UC type microdrill 50'. The sectional contours of the two helical flutes 58 of the microdrill 50 are concave curves, so the web thickness 62 of the microdrill 50 is theoretically equal to the diameter of a minimum common tangent circle of the sectional contours of the two helical flutes 58 (i.e. the shortest distance between the sectional contours of the two helical flutes 58) and may be easily measured. On the other hand, since the drill body 54' of the microdrill 50' is ground to yield a UC diameter on the drill body 54' and is fluted with the grinding wheel whose wheel contour is made up of combinations of multiple arcs, the sectional contours of the two helical flutes 58' of the microdrill 50' are sigmoid or convex curves. The web thickness of the microdrill 50' is theoretically equal to the diameter of a maximum common tangent circle of the sectional contours of the two helical flutes 58'. Therefore, the web thickness of the microdrill 50' has such a complicated definition and is not easily measured.

The web thickness measuring methods of microdrills can be based on a non-destructive measuring technology or a destructive measuring technology in general. In practice, the non-destructive web thickness measuring method, such as the disclosure in the Taiwan Patent Publication No. I254124, still has problems such as high cost and insufficient stability, which limits the development of the non-destructive measuring technology of web thickness. Therefore, most manufacturers prefer using manual and destructive measuring technology of web thickness. The Taiwan Patent Publication No. I413756, i.e. the U.S. Patent Publication No. 20120236139, discloses a destructive web thickness measuring system of microdrills and a method thereof, which employ two vision modules disposed in different orientations to capture a microdrill in different directions to generate images presenting the microdrill, and then sequentially perform a positioning procedure, a grinding procedure, and an image computing procedure on the images of the microdrill to calculate the web thickness of the microdrill at a sectional position to be measured of the microdrill. However, such a disclosure in the Taiwan Patent Publication No. I413756 is applied to only ST type microdrills but not to UC type microdrills, that is, this disclosure has limits on the types of microdrills. Moreover, the disclosure in the Taiwan Patent Publication No. I413756 has to use two vision modules, resulting in more cost.

SUMMARY

According to one or more embodiments, the disclosure provides an improved destructive and visual measurement automation system for measuring a web thickness of a microdrill, and the measurement automation system is short for the improved destructive and visual measurement automation system hereinafter. In one embodiment, the measurement automation system may include a computer, a dual-axis motion platform module, a drill grinding module, a reflection module and a vision module. The dual-axis motion platform module may electrically connect to the computer, hold the microdrill, and be controlled by the computer to move the microdrill. The drill grinding module may electrically connect to the computer, and when the dual-axis motion platform module moves the microdrill to a grinding position, the drill grinding module may grind the microdrill to a sectional position to be measured to form an axial cross-section of the microdrill. When the dual-axis motion platform module moves the microdrill to a first position at which the microdrill does not contact with the drill grinding module, the reflection module may reflect a first image, which presents a drill tip of the microdrill and the drill grinding module, in a first direction toward a second direction. The vision module may electrically connect to the computer. When the vision module acquires the reflected first image in the second direction and outputs the acquired first image to the computer, the computer may obtain a first distance between the drill grinding module and the drill tip of the microdrill according to the acquired first image. When the dual-axis motion platform module moves the microdrill to a second position at which the microdrill is in an image capture region of the vision module, the vision module may acquire a second image, presenting the axial cross-section of the microdrill at the sectional position to be measured, in the second direction and output the second image to the computer, and the computer may calculate the web thickness of the microdrill at the sectional position to be measured according to the second image. Moreover, the computer may control the drill grinding module according to the first distance and the sectional position to be measured to grind the microdrill to the sectional position to be measured.

According to one or more embodiments, the disclosure provides an improved destructive and visual measurement method for measuring a web thickness of a microdrill. Hereinafter, the measurement method is short for the improved destructive and visual measurement method. In one embodiment, the measurement method may include the following steps: setting a position parameter which specifies a sectional position to be measured of the microdrill; moving the microdrill to a first position at which the microdrill does not contact with a drill grinding module; performing focusing for the drill grinding module; reflecting a first image, which presents the drill grinding module and a drill tip of the microdrill, in a first direction toward a second direction via a reflection module; acquiring the reflected first image in the second direction; performing a positioning procedure according to the first image to obtain a first distance between the microdrill and the drill grinding module; performing a grinding procedure according to the first distance and the sectional position to be measured to control the drill grinding module to grind the microdrill to the sectional position to be measured to form an axial cross-section of the microdrill; moving the microdrill to a second position; performing focusing for the axial cross-section of the microdrill at the sectional position to be measured; acquiring a second image, which presents a background and an axial cross-section of the microdrill, in the second direction; adjusting brightness, contrast and gamma values of the second image; performing a thresholding operation to distinguish the axial cross-section from the background; performing a morphological operation to eliminate at least one noise in the background and compensate at least one hole in the axial cross-section in the second image; performing a computing procedure according to the axial cross-section to obtain a centroid of the axial cross-section; performing an edge detection procedure to obtain a plurality of edge contour points of the axial cross-section; obtaining a plurality of edge contour points of a first flute contour area and a plurality of edge contour points of a second flute contour area by determining a distance between each edge contour point of the axial cross-section and the centroid of the axial cross-section; performing curve fitting to the edge contour points of the first flute contour area to obtain a first curve, and performing curve fitting to the edge contour points of the second flute contour area to obtain a second curve; performing circle fitting to the first curve and the second curve to obtain a fitted circle; deleting a part of the first curve and a part of the second curve outside the fitted circle and performing circle fitting to the rest of the first curve and the rest of the second curve, until a diameter of the fitted circle is converged to be a best-fitted circle; and obtaining the web thickness of the microdrill at the sectional position to be measured according to a diameter of the best-fitted circle.

Accordingly, the measurement automation system and the measurement method in the disclosure can automatically measure the web thickness of the microdrill at the sectional position to be measured. Through the vision module that can receive a second light beam reflected by the reflection module, the measurement automation system in the positioning procedure and the grinding procedure may effectively check whether the drill grinding module grinds the microdrill to the sectional position to be measured, thereby effectively reducing the cost of the measurement automation system. Through the vision module cooperating with the image computing procedure, the disclosure may increase the stability of measurement and be able to be applied to microdrills of different types. Moreover, through the computer, the disclosure may effectively monitor the procedure for measuring the microdrill.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1A:
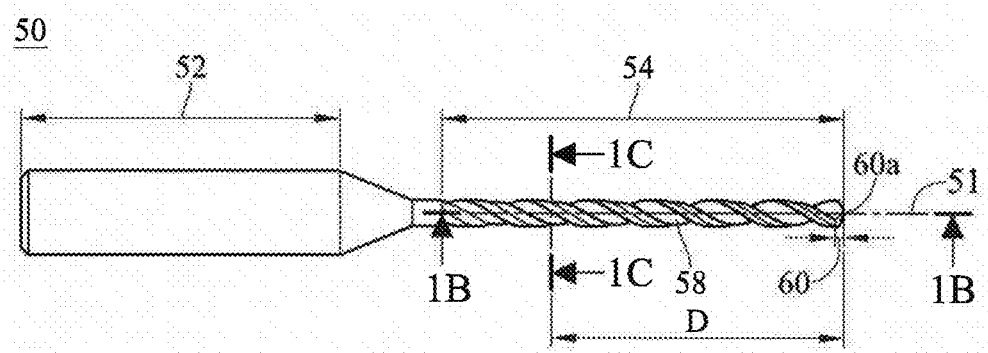
FIG. 1A is a schematic lateral view of a microdrill according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
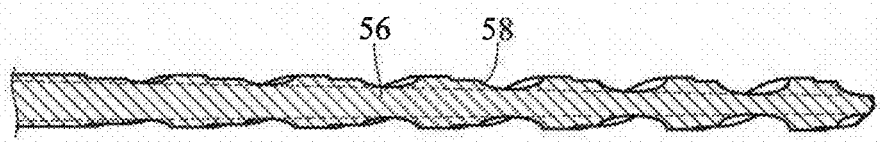
FIG. 1B is a sectional view of the microdrill in FIG. 1A along a section-line of 1B-1B.
Figure 1C:
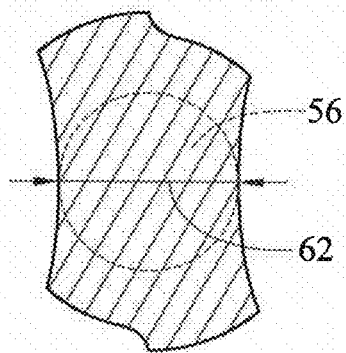
FIG. 1C is a sectional view of the microdrill in FIG. 1A along a section-line of 1C-1C.
Figure 1D:
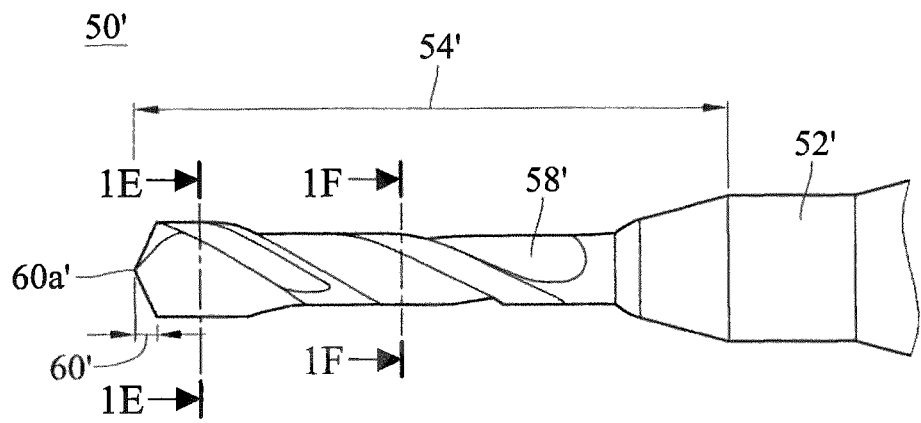
FIG. 1D is a schematic lateral view of a microdrill according to an embodiment.
Figure 1E:
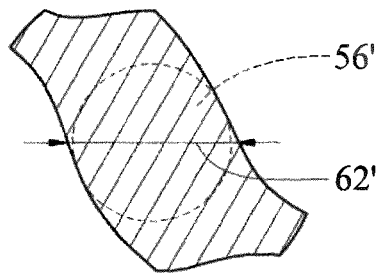
FIG. 1E is a sectional view of the microdrill in FIG. 1D along a section-line of 1E-1E.
Figure 1F:
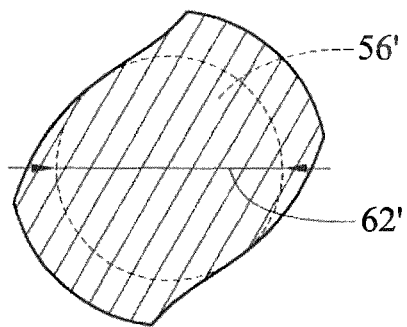
FIG. 1F is a sectional view of the microdrill in FIG. 1D along a section-line of 1F-1F.
Figure 2A:
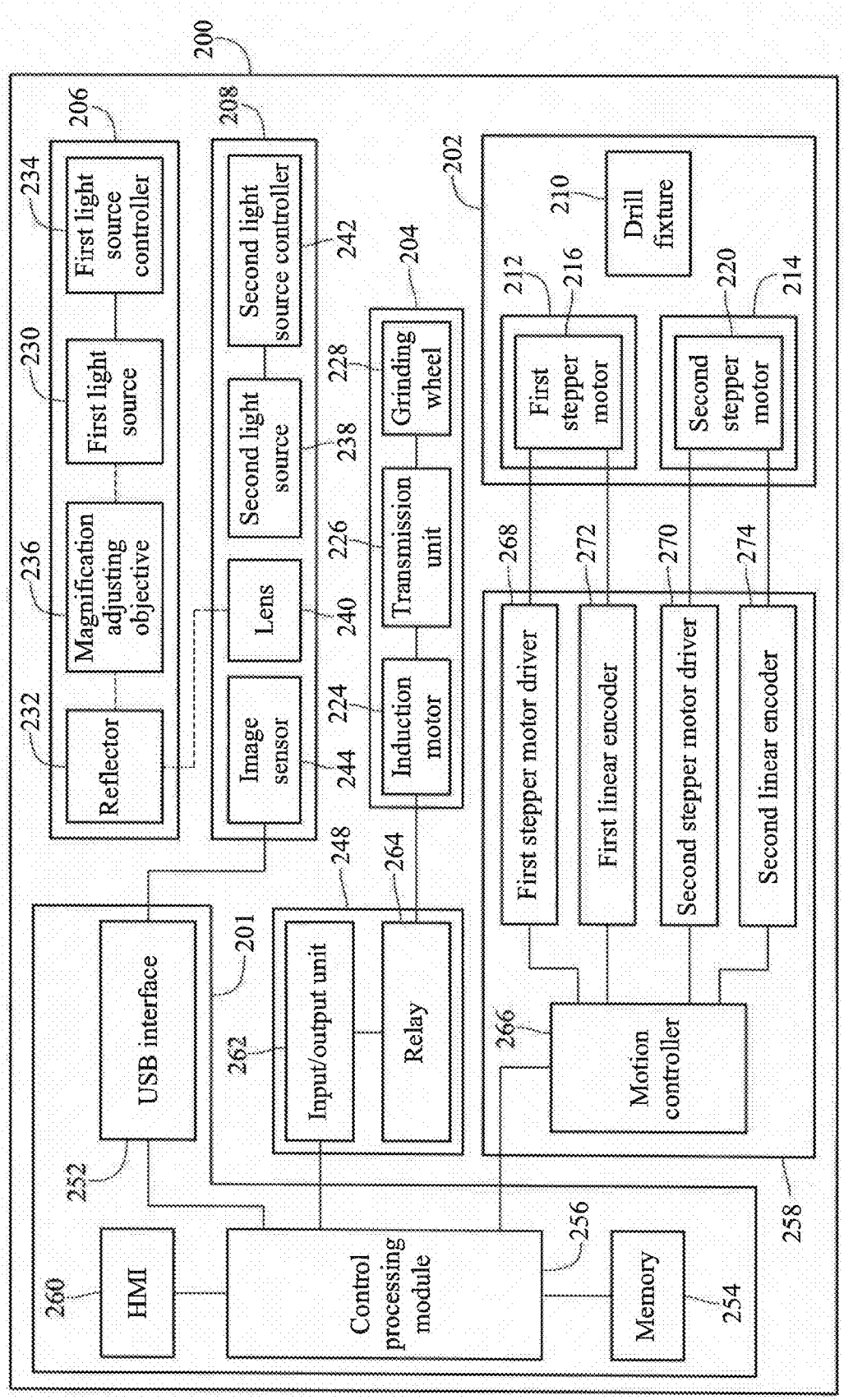
FIG. 2A is a schematic block diagram of a measurement automation system according to an embodiment.
Figure 2B:
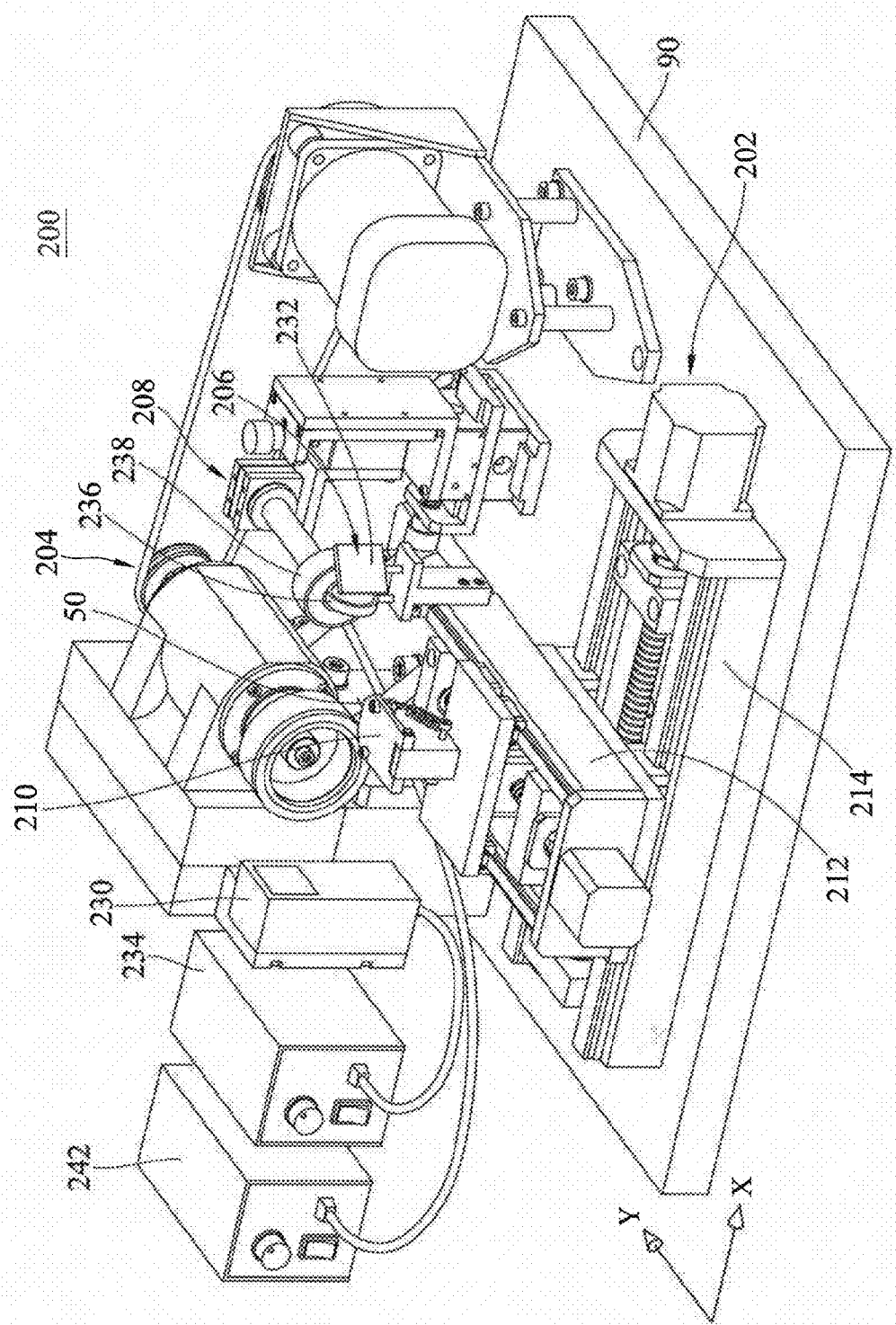
FIG. 2B is a schematic stereogram of a dual-axis motion platform module, a drill grinding module, a reflection module, and a vision module according to an embodiment.
Figure 2C:
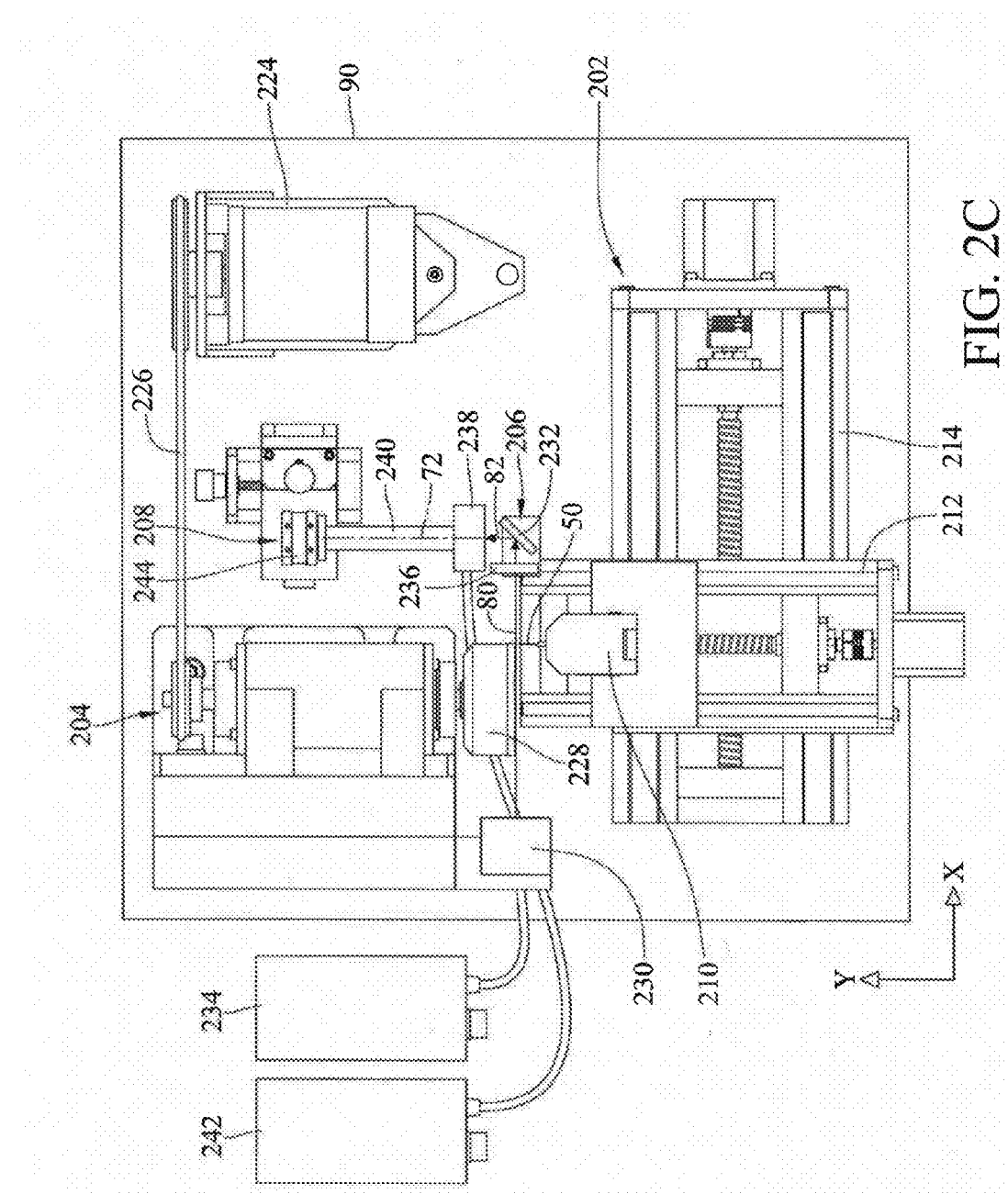
FIG. 2C is schematic top view of the dual-axis motion platform module, the drill grinding module, the reflection module, and the vision module according to an embodiment.

According to one or more embodiments, the disclosure provides an improved destructive and visual measurement automation system for measuring a web thickness of a microdrill, and hereinafter the measurement automation system is short for the improved destructive and visual measurement automation system. FIG. 2A to FIG. 2C illustrate a measurement automation system 200. The measurement automation system 200 may measure the web thickness 62 of the microdrill 50 at the sectional position to be measured D on the microdrill 50 in FIG. 1A to FIG. 1C and the web thickness 62' of the microdrill 50' at the sectional position to be measured E or F in FIG. 1D to FIG. 1F. The microdrill 50 may be a ST type drill or a UC type drill. Therefore, in the one or more following embodiments, the description related to the microdrill 50 and the sectional position to be measured D may be adapted to the measurement of the microdrill 50' and the sectional position to be measured E or F.

The measurement automation system 200 may include a computer 201, a dual-axis motion platform module 202, a drill grinding module 204, a reflection module 206, a vision module 208, a grinding wheel switch sub-module 248, and a motion control sub-module 258. The dual-axis motion platform module 202, the drill grinding module 204, the reflection module 206, and the vision module 208 may be disposed on a base 90. The dual-axis motion platform module 202 may electrically connect to the motion control sub-module 258, and the motion control sub-module 258 may be attached to the dual-axis motion platform module 202. The drill grinding module 204 may electrically connect to the grinding wheel switch sub-module 248, and the grinding wheel switch sub-module 248 may be attached to the drill grinding module 204. The vision module 208, the grinding wheel switch sub-module 248 and the motion control sub-module 258 may electrically connect to the computer 201. For example, the computer 201 is a personal computer.

The grinding wheel switch sub-module 248 may include an input/output unit 262 and a relay 264. The motion control sub-module 258 may include a motion controller 266, a first stepper motor driver 268, a second stepper motor driver 270, a first linear encoder 272, and a second linear encoder 274. The operation of components in the measurement automation system 200 is described below.

Figure 2D:
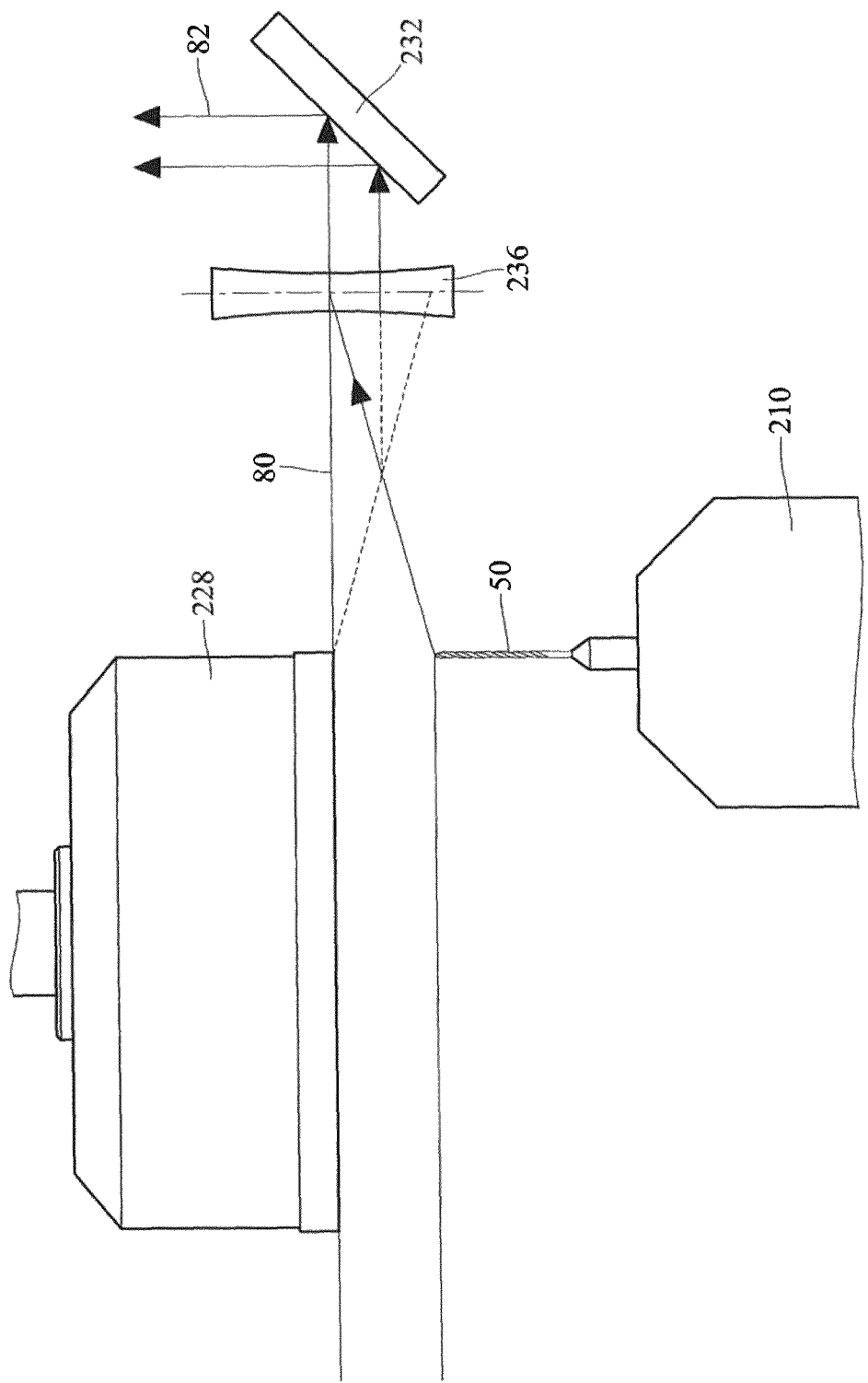
FIG. 2D is a schematic view of the partial enlargement of FIG. 2C.

The dual-axis motion platform module 202 may move the microdrill 50 along a longitudinal axis Y or a transversal axis X which is perpendicular to the longitudinal axis Y. The dual-axis motion platform module 202 may include a drill fixture 210, a longitudinal motion unit 212, and a traverse motion unit 214. The drill fixture 210 may hold or clamp the microdrill 50, as shown in FIG. 2D. The longitudinal motion unit 212 may include a first stepper motor 216 and control the drill fixture 210 to move along the longitudinal axis Y. The traverse motion unit 214 may include a second stepper motor 220 and control the drill fixture 210 to move along the transversal axis X.

The drill grinding module 204 may grind the microdrill 50 to a sectional position to be measured D on the microdrill 50 after the microdrill 30 is moved to a grinding position which may be where the microdrill 50 contacts with the grinding wheel 228. The drill grinding module 204 may include an induction motor 224, a transmission unit 226, and a grinding wheel 228. The induction motor 224 may rotate the grinding wheel 228 via a transmission unit 226, e.g. a transmission belt, to grind the microdrill 50 to the sectional position to be measured D. In one embodiment, the drill grinding module 204 may further include a dust collection unit (not shown) which collects dust produced by grinding the microdrill 50, thereby preventing the image capture of the vision module 208 from the influence of dust.

The reflection module 206 may receive a first light beam 80 to form the reflected light beam as a second light beam 82. As shown in FIG. 2C and FIG. 2D, when the dual-axis motion platform module 202 moves the microdrill 50 to a first position where the microdrill 50 does not contact with the drill grinding module 204, the first light beam 80 may be reflected by the reflection module 206 to form the second light beam 82. Herein, the microdrill 50 may be on the traveling path of the first light beam 80, and the traveling path of the second light beam 82 may be in the image capture region of the vision module 208. In other words, when the dual-axis motion platform module 202 moves the microdrill 50 to the first position, the reflection module 206 may reflect a first image, which is related to the first light beam 80 in the first direction and presents a drill tip 60a of the microdrill 50 and a grinding wheel 228 of the drill grinding module 204, toward a second direction. This first direction is the traveling direction of the first light beam 80, and this second direction is the traveling direction of the second light beam 82. For example, the first direction is parallel to the transversal axis X, and the second direction is parallel to the longitudinal axis Y.

The reflection module 206 may include a first light beam source 230, a reflector 232, a first light source controller 234, and a magnification adjusting objective 236. The magnification adjusting objective 236 may be located between the first light source 230 and the reflector 232. The first light source 230 may project the first light beam 80 along the first direction. The first light source controller 234 may adjust the brightness of the first light beam 80. The magnification adjusting objective 236 may allow the first light beam 80 to pass through it, so that the vision module 208 may acquire the first image with a smaller imaging magnification. The reflector 232 may reflect the first light beam 80 toward the second direction, the reflected first light beam 80 may be defined as the second light beam 82 in the second direction, and the direction of the first light beam 80 projected on the reflector 232 may be perpendicular to the direction of the second light beam 82 reflected from the reflector 232.

When the dual-axis motion platform module 202 moves the microdrill 50 to the first position, the first light source 230 may project the first light beam 80 along the first direction. This first light beam 80 in the first direction may pass through the magnification adjusting objective 236 and then be reflected by the reflector 232 to become the second light beam 82 in the second direction. Finally, the vision module 208 may receive the second light beam 82 from the reflector 232, convert the received second light beam 82 to the first image, and output the first image to the computer 201.

In one embodiment, the reflector 232 and the magnification adjusting objective 236 may be located at one end of the dual-axis motion platform module 202, so that the position of the reflector 232 and the position of the magnification adjusting objective 236 may be changed according to the position of the microdrill 50. More particularly, the magnification adjusting objective 236 and the reflector 232 may be moved in synchronism with the traverse motion unit 214 of the dual-axis motion platform module 202.

For example, the first light source 230 and the first light source controller 234 are powered by the computer 201 directly, or by an external power source (e.g. the power at a socket). For example, the first light source 230 is a light source for providing collimated light (or called a light beam). For example, the magnification adjusting objective 236 is a lens for adjusting magnification on which the disclosure will not have any limits.

The vision module 208 may acquire the first image presenting the microdrill 50 and the drill grinding module 204, and acquire a second image presenting the microdrill 50 at the sectional position to be measured D. As shown in FIG. 2C and FIG. 2D, when the dual-axis motion platform module 202 moves the microdrill 50 to the first position, the vision module 208 may receive the second light beam 82 associated with the first image and output the first image to the computer 201, so that the computer 201 may obtain a first distance between the microdrill 50 and the drill grinding module 204 according to the first image. In other words, the vision module 208 may receive the reflected first image in the second direction and output it to the computer 201, and then the computer 201 may obtain the first distance between the drill tip 60a and the grinding wheel 228 according to the first image.

Figure 2E:
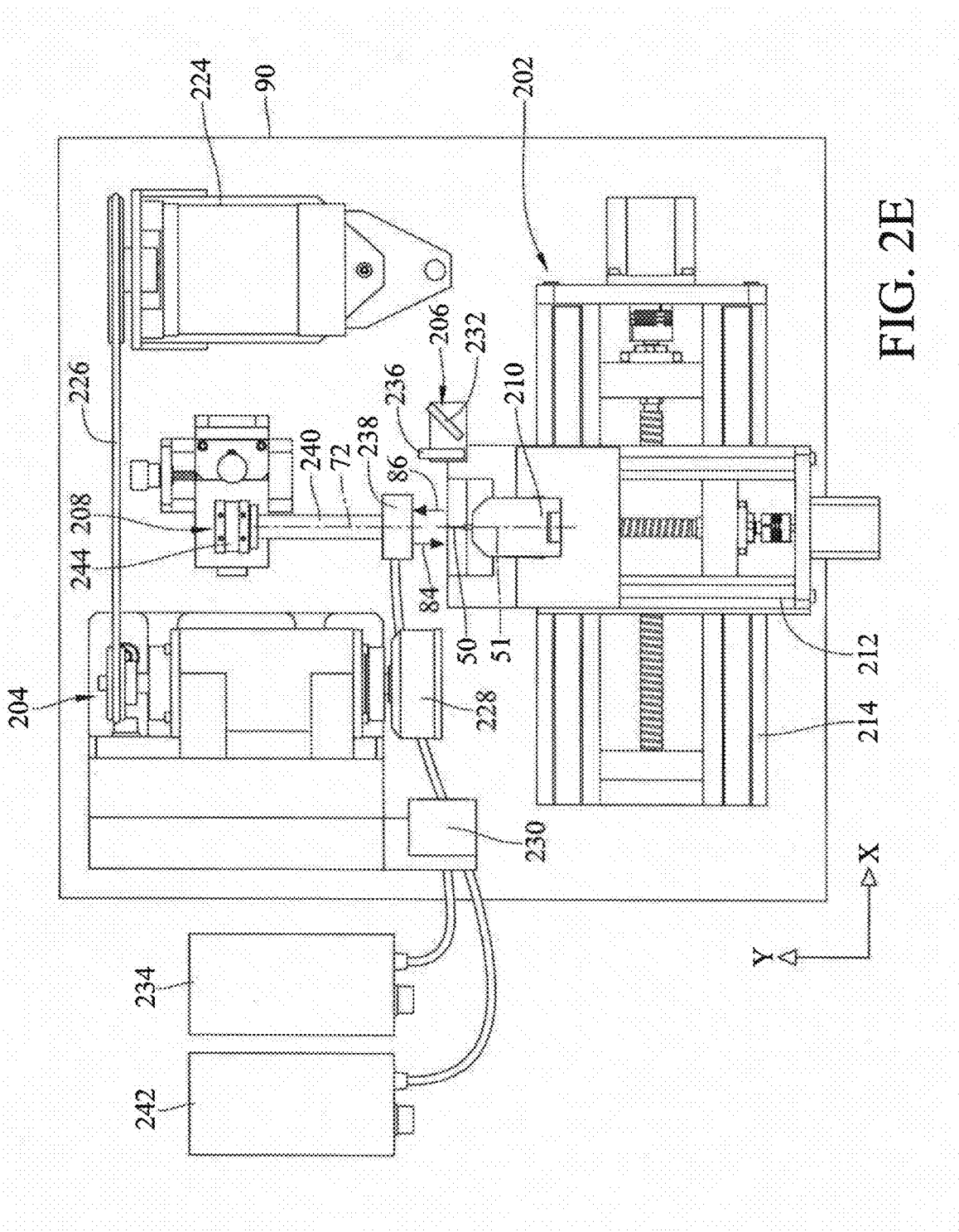
FIG. 2E is a schematic top view of the dual-axis motion platform module, the drill grinding module, the reflection module, and the vision module when the microdrill is moved to the second position.
Figure 2F:
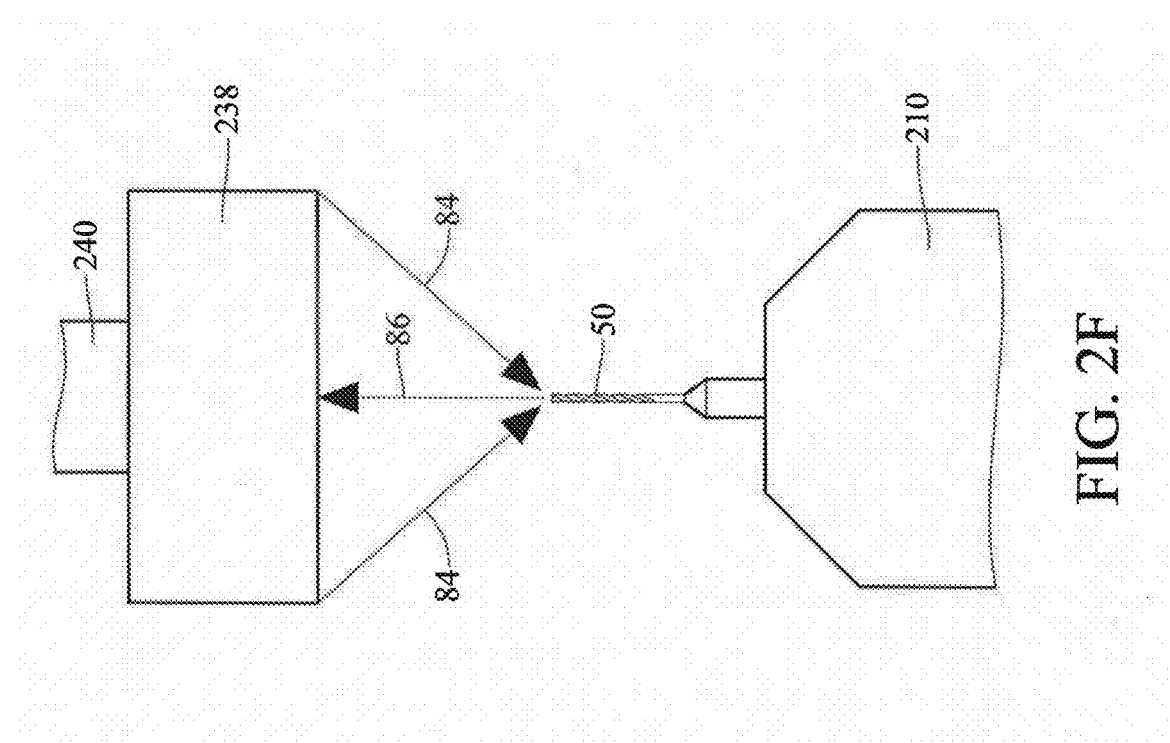
FIG. 2F is a schematic view of the partial enlargement of FIG. 2E.
Figure 7A:
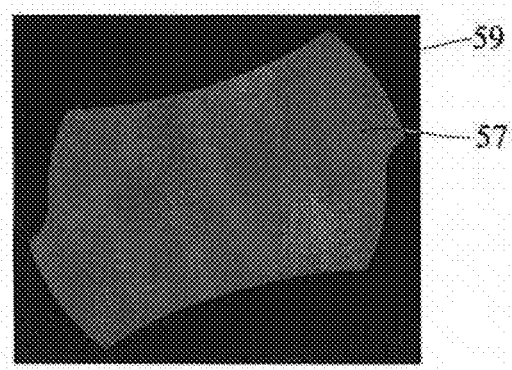
FIG. 7A is a schematic view of the second image in step 318 according to an embodiment.
Figure 8A:
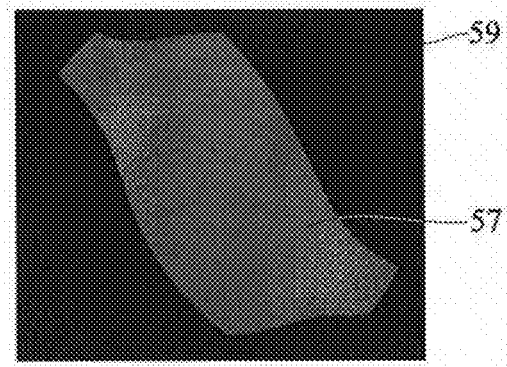
FIG. 8A is a schematic view of the second image in step 318 according to an embodiment.

Refer to FIG. 2E and FIG. 2F, where FIG. 2E is a schematic top view of the dual-axis motion platform module 202, the drill grinding module 204, the reflection module 206, and the vision module 208 when the microdrill 50 is moved to a second position, and FIG. 2F is a schematic view of the partial enlargement of FIG. 2E. When the dual-axis motion platform module 202 moves the microdrill 50 to the second position in an image capture region of the vision module 208, the vision module 208 may output the second image to the computer 201. Then, the computer 201 may obtain a web thickness 62 of the microdrill 50 at the sectional position to be measured D according to the second image. In other words, when the dual-axis motion platform module 202 moves the microdrill 50 to the second position, the vision module 208 may acquire the second image, presenting the axial cross-section 57 of the microdrill 50 at the sectional position to be measured D, in the second direction as shown in FIG. 7A and FIG. 8A and output the second image to the computer 201, so that the computer 201 may calculate the web thickness 62 of the microdrill 50 at the sectional position to be measured D according to the second image.

Moreover, the vision module 208 may include a second light source 238, a lens 240, a second light source controller 242, and an image sensor 244. The second light source 238 may project a third light beam 84. The second light source controller 242 may adjust the brightness of the third light beam 84. The third light beam 84 may be projected on the axial cross-section 57 of the microdrill 50, as shown in FIG. 7A and FIG. 8A, and then be reflected to become a reflected light beam 86 along the second direction. The reflected light beam 86 in the second direction may pass through the lens 240 and be received by the image sensor 244 to become the second image. In other words, the reflected light beam 86 may be converted to the second image by the image sensor 244 after passing through the lens 240, and then the image sensor 244 may output the second image to the computer 201. For example, the lens 240 is a telecentric lens with a fixed magnification such as 14× or 16×. Moreover, the optic axis 72 of the lens 240 may be parallel to the central axis 51 of the microdrill 50, thereby avoiding errors. For example, the optic axis 72 overlaps the central axis 51 of the microdrill 50 as shown in FIG. 2E.

For example, the second light source 238 is a high-brightness centralized ring light source. For example, the image sensor 244 is a complementary metal-oxide-semiconductor (CMOS) camera or a charge coupled device (CCD) camera. The second light source 238 and the second light source controller 242 may be powered by the computer 201 directly or by the external power at the socket.

The lens 240 may be a telecentric lens with a fixed magnification, and when the magnification adjusting objective 236 is used, the field of view (FOV) of the first image may be larger than the FOV of the second image. Accordingly, when the microdrill 50 is moved to the first position, the first distance between the microdrill 50 and the grinding wheel 228 may not be too small, thereby avoiding the unexpected collision between the microdrill 50 and the grinding wheel 228, which may damage the hardware.

The computer 201 may include a universal serial bus (USB) interface 252, a memory 254, a control processing module 256, and a human machine interface (HMI) 260. The computer 201 may control the induction motor 224 via the input/output unit 262 and the relay 264 to drive the drill grinding module 204. The USB interface 252 electrically connects to the image sensor 244 whereby the computer 201 can acquire the first image and the second image. The memory 254 may store the first image and the second image. The control processing module 256 may control and perform a destructive measurement procedure for measuring the web thickness of the microdrill 50.

Through electrically connecting to the motion controller 266, the computer 201 may command the first stepper motor driver 268 to drive the first stepper motor 216 to further drive the longitudinal motion unit 212 to move along the longitudinal axis Y, and also command the second stepper motor driver 270 to drive the second stepper motor 220 to further drive the traverse motion unit 214 to move along the transversal axis X. The first linear encoder 272 may sense the position of the longitudinal motion unit 212 and report it to the motion controller 266, so that the motion controller 266 may perform a close loop motion control of the longitudinal axis Y to control the distance that the longitudinal motion unit 212 should move along the longitudinal axis Y. Similarly, the second linear encoder 274 may sense the position of the traverse motion unit 214 and report it to the motion controller 266, so that the motion controller 266 may perform a close loop motion control of the transversal axis X to control the distance that the traverse motion unit 214 should move along the transversal axis X.

The human machine interface 260 not only may receive information of the microdrill 50, such as type, position parameters and measurement setting, inputted by users, and provide this information of the microdrill 50 for the measurement automation system 200 to arrange its operation according to the measurement requirement, but also may show users the operation states of the measurement automation system 200, the first image, and the second image. Therefore, the computer 201 may control the drill grinding module 204 according to the first distance and the sectional position to be measured D to drive the drill grinding module 204 to grind the microdrill 50 to the sectional position to be measured D.

The detailed operation of the measurement automation system 200 is described below by referring to FIG. 2A and FIG. 3.

Figure 3:
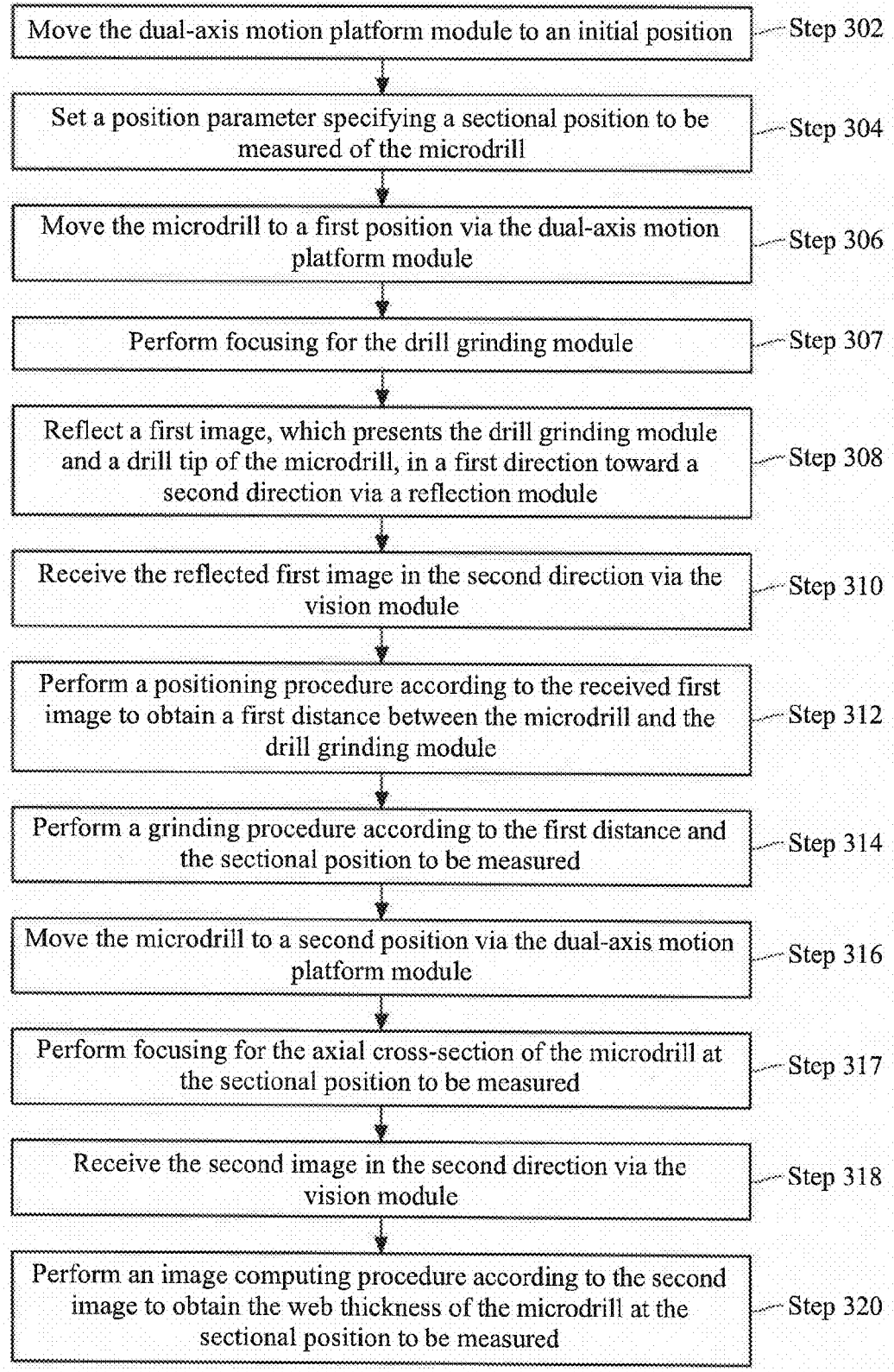
FIG. 3 is a flow cart of a measurement method performed by the measurement automation system in FIG. 2A according to an embodiment.

FIG. 3 is a flow cart of an improved destructive and visual measurement method performed by the measurement automation system 200 in FIG. 2A according to an embodiment. The measurement method may include the following steps. First, as shown in step 302, the dual-axis motion platform module 202 may be moved to an initial position, and as shown in step 304, a position parameter specifying the sectional position to be measured D on the microdrill 50 may be set. As shown in step 306, the dual-axis motion platform module 202 may move the microdrill 50 to the first position where the microdrill 50 does not contact with the grinding wheel 228 in the drill grinding module 204. Specifically, the computer 201 may control the motion control sub-module 258 to move the longitudinal Illation unit 212 and the traverse motion unit 214, thereby moving the microdrill 50 to the first position.

Then, as shown in step 307, focusing for the grinding wheel 228 in the drill grinding module 204 may be performed, so that the drill tip 60a of the microdrill 50 and the grinding wheel 228 of the drill grinding module 204 sufficiently approach a first focal point related to an object distance of the lens 240 in combination with the magnification adjusting objective 236 and the reflector 232. As shown in step 308, the first image presenting the drill tip 60a of the microdrill 50 and the grinding wheel 228 of the drill grinding module 204 in the first direction may be reflected by the reflection module 206 toward the second direction. In other words, the first light beam 80 in the first direction is reflected by the reflection module 206 to become the second light beam 82 in the second direction. Herein, the microdrill 50 may be on the traveling path of the first light beam 80, and the traveling path of the second light beam 82 may be in the image capture region of the vision module 208. Therefore, the reflected first image in the second direction may be received by the vision module 208, as shown in step 310.

As shown in step 312, a positioning procedure is performed according to the received first image to obtain a first distance between the microdrill 50 and the drill grinding module 204. As shown in step 314, a grinding procedure is performed according to the first distance and the sectional position to be measured D to control the drill grinding module 204 to grind the microdrill 50 to the sectional position to be measured D whereby the microdrill 50 may have the axial cross-section 57 at the sectional position to be measured D.

Furthermore, as shown in step 316, the dual-axis motion platform module 202 moves the microdrill 50 to the second position which is in the image capture region of the vision module 208. As shown in step 317, focusing for the axial cross-section 57 of the microdrill 50 at the sectional position to be measured D may be performed, so that the axial cross-section 57 of the microdrill 50 at the sectional position to be measured D may sufficiently approach a second focal point which is an object distance of the lens 240.

Then, as shown in step 318, the vision module 208 may receives the second image of the microdrill 50 in the second direction. Finally, as shown in step 320, a computing procedure (or called an image computing procedure hereinafter) is performed according to the second image to obtain the web thickness 62 of the microdrill 50 at the sectional position to be measured D.

In addition, before or after the step 302, the drill fixture 210 may hold the microdrill 50. In the step 302, the initial position may be defined as the initial position of the dual-axis motion platform module 202 set by users, or may be defined as the position where the microdrill 50 can be easily put on the drill fixture 210. Therefore, the initial position can be adjusted according to particular requirements. For example, the position parameter in the step 304 is inputted via the human machine interface 260. For example, the quantity of the position parameter is single or plural, and the one or more embodiments about the situation that there are many position parameters will be described later. In the step 304, information about the type of the microdrill 50 may be set.

Figure 4:
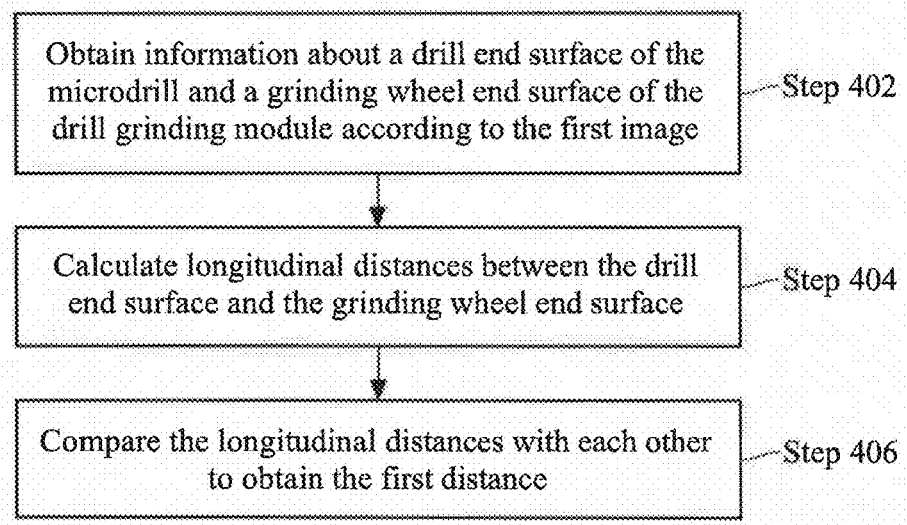
FIG. 4 is a flow chart of the positioning procedure in step 312 according to an embodiment.

FIG. 4 is a flow chart of the positioning procedure in step 312 according to an embodiment. The positioning procedure may include the following steps. First, as shown in step 402, information about a drill end surface 10 of the microdrill 50 and a grinding wheel end surface 11 of the drill grinding module 204 may be obtained according to the first image, and then a plurality of longitudinal distances between the drill end surface 10 and the grinding wheel end surface 11 may be calculated, as shown in step 404. Finally, as shown in step 406, these longitudinal distances are compared with each other to obtain the first distance.

Figure 5A:
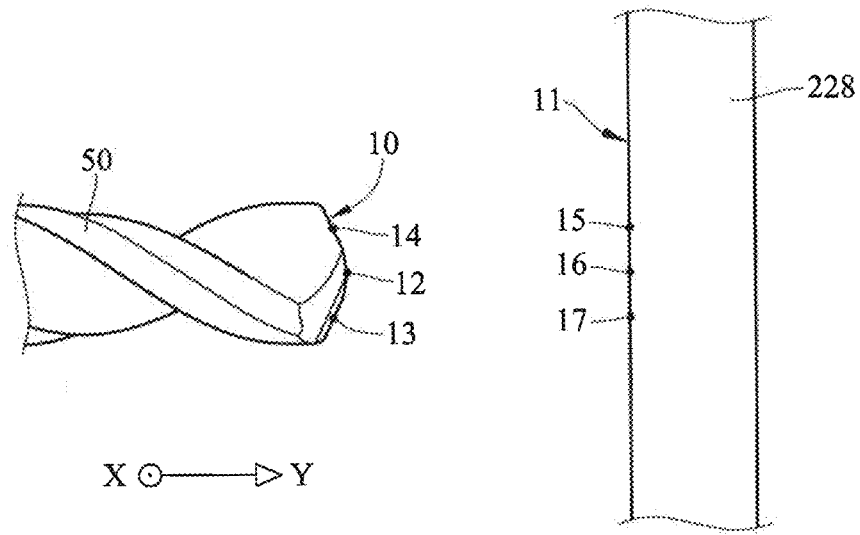
FIG. 5A is a schematic view of the first image in step 310 according to an embodiment.

Referring to FIG. 4 and FIG. 5A, the content of the first image is described as follows. FIG. 5A is a schematic view of the first image in step 310 according to an embodiment. The first image may be the mirroring of the view in FIG. 5A due to the reflection of the reflector 232, and thus the relation between the locations of objects in the first image may not be changed. The first image may present the above drill end surface 10 and the above grinding wheel end surface 11. The drill end surface 10 is a terminal surface of the drill point 60 of the microdrill 50 not ground, or is a terminal surface of the ground microdrill 50 at the ground sectional position.

Specifically, when the microdrill 50 has not moved to the first position yet, only the grinding wheel end surface 11 of the grinding wheel 228 may be located between the first light source 230 and the reflector 232. When the microdrill 50 is moved to the first position, both of the microdrill 50 and the grinding wheel end surface 11 of the grinding wheel 228 may be located between the first light source 230 and the reflector 232. Herein, the first light beam 80 projected by the first light source 230 may pass through the drill end surface 10 of the microdrill 50 and the grinding wheel end surface 11 of the grinding wheel 228 and then be reflected by the reflector 232 to become the second light beam 82, and the second light beam 82 may further travel to and be received by the image sensor 244 of the vision module 208 to become the first image. Therefore, the first image may show the silhouette or contour of the drill end surface 10 of the microdrill 50 and the silhouette or contour of the grinding wheel end surface 11 of the grinding wheel 228 at the same time. For example, the above imaging method is based on a back light source.

Figure 5B:
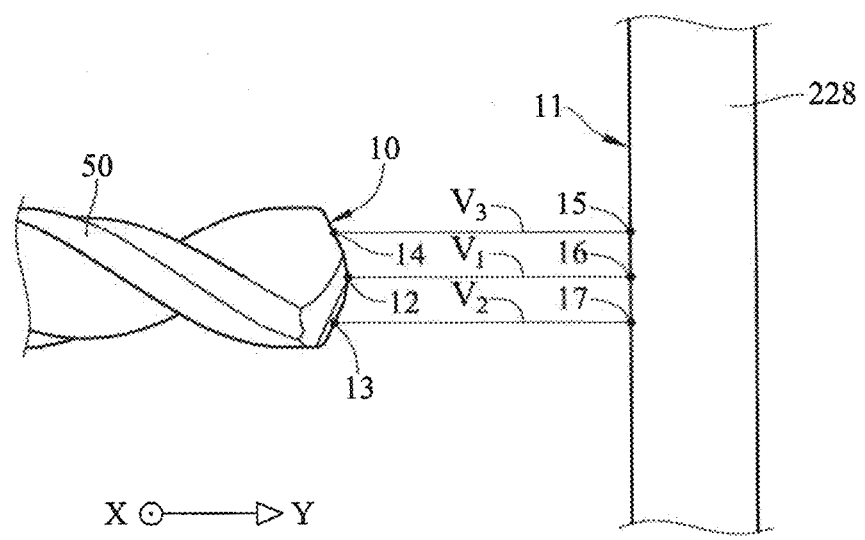
FIG. 5B is a schematic view of the microdrill and the grinding wheel in step 404 according to an embodiment.

Refer to FIG. 4 and FIG. 5B, wherein FIG. 5B is a schematic view of a relation between the microdrill and the grinding wheel in step 404 according to an embodiment. In the step 404, each of the longitudinal distances $V_1$, $V_2$ and $V_3$ in FIG. 5B is a minimum image distance between one point on the drill end surface 10 and one point on the grinding wheel end surface 11, and the extending orientation of the two points respectively on the drill end surface 10 and the grinding wheel end surface 11 may be parallel to the longitudinal axis Y. For example, the unit of each longitudinal distance is pixel.

Assume the drill end surface 10 at least has three first points 12, 13 and 14, and the grinding wheel end surface 11 at least has three second points 15, 16 and 17. The minimum distance between the first point 12 and the second point 16 is defined as the longitudinal distance $V_1$, the minimum distance between the first point 13 and the second point 17 is defined as the longitudinal distance $V_2$, and the minimum distance between the first point 14 and the second point 15 is defined as the longitudinal distance $V_3$. The microdrill may be moved along the longitudinal axis Y.

Figure 5C:
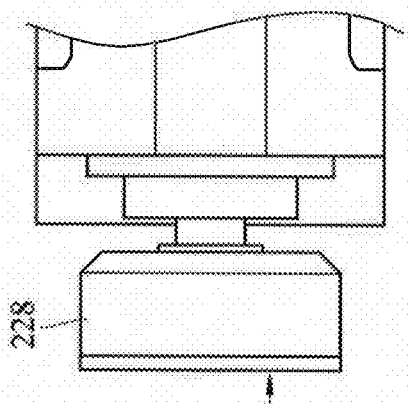
FIG. 5C is a schematic view of the microdrill and the grinding wheel according to an embodiment when the microdrill is moved to a first position.

In the step 406, assume the longitudinal distance $V_1$ is smaller than the longitudinal distance $V_3$, and the longitudinal distance $V_3$ is smaller than the longitudinal distance $V_2$. Therefore, the longitudinal distance $V_1$ is selected to be the first image distance, and this first image distance may be converted to a physical quantity to obtain the first distance $V_1'$ as shown in FIG. 5C.

Figure 6:
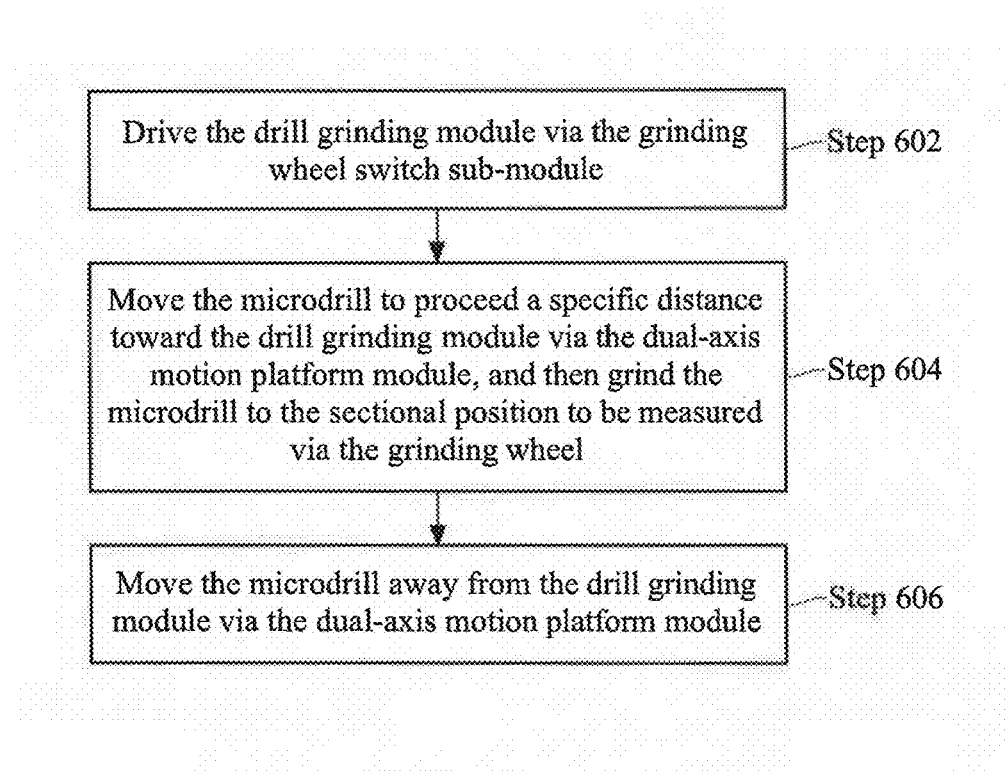
FIG. 6 is a flow chart of the grinding procedure in step 314 according to an embodiment.

Refer to FIG. 2A and FIG. 6, wherein FIG. 6 is a flow chart of the grinding procedure in step 314 according to an embodiment. The grinding procedure may include the following steps. As shown in step 602, the grinding wheel switch sub-module 248 may drive the drill grinding module 204. As shown in step 604, the dual-axis motion platform module 202 may move the microdrill 50 to proceed a specific distance toward the drill grinding module 204, and then the grinding wheel 228 of the drill grinding module 204 may grind the microdrill 50 to the sectional position to be measured D on the microdrill 50. This specific distance may be related to the position parameter and the first distance. In one embodiment, this specific distance may be equal to the sum of the distance between the sectional position to be measured D to the drill tip 60a (as shown in FIG. 1A) and the first distance $V_1'$ (as shown in FIG. 5C, which is a schematic view of the microdrill moved to a first position according to an embodiment).

Figure 5D:
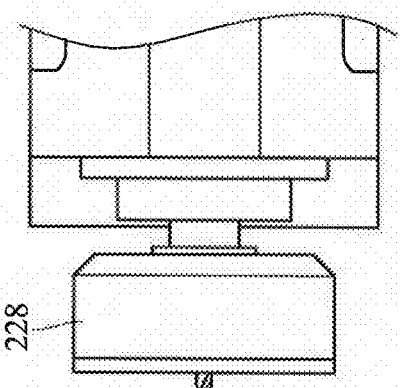
FIG. 5D is a schematic view of the microdrill and the grinding wheel according to an embodiment when the grinding wheel grinds the microdrill to a sectional position be measured.

As shown in step 606, the dual-axis motion platform module 202 may move the microdrill 50 away from the drill grinding module 204. Specifically, in one embodiment, when the microdrill 50 is ground by the grinding wheel 228 of the drill grinding module 204 to the sectional position to be measured D as shown in FIG. 5D, the dual-axis motion platform module 202 may move the microdrill 50 to remove the microdrill from the drill grinding module 204. In other one embodiment, when the microdrill 50 has been ground by the grinding wheel 228 of the drill grinding module 204 to the sectional position to be measured D, the grinding wheel switch sub-module 248 may control the grinding wheel 228 of the drill grinding module 204 to stop grinding the grind microdrill 50.

Subsequently, the motion control sub-module 258 may control the dual-axis motion platform module 202 to move the microdrill 50 to the second position (i.e. the step 316), and then control the image sensor 244 of the vision module 208 to acquire the second image (i.e. the step 318). More particularly, when the microdrill 50 is moved to the second position, the third light beam 84 emitted from the second light source 238 may be projected on the axial cross-section 57 of the microdrill 50 and reflected by the axial cross-section 57 to become the reflected light beam 86, and the reflected light beam 86 may pass through the lens 240 and then be received by the image sensor 244 to become the second image. Therefore, this second image may present the axial cross-section 57 of the microdrill 50 and the background 59 around the microdrill 50, as shown in FIG. 7A. For example, the imaging method is based on a front light source.

Figure 7B:
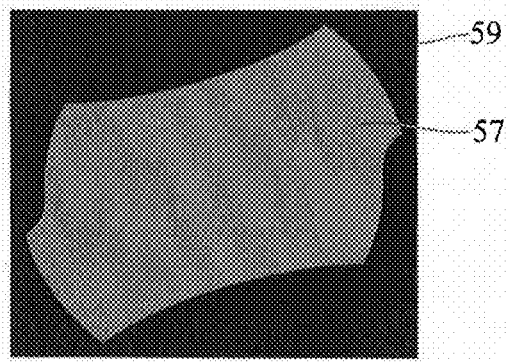
FIG. 7B to FIG. 7I are schematic views of the image computing procedure in step 320 according to an embodiment.
Figure 7C:
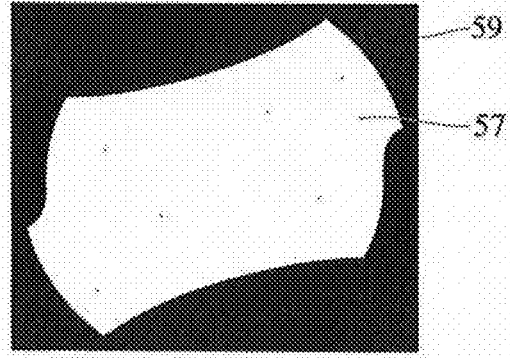
Figure 7D:
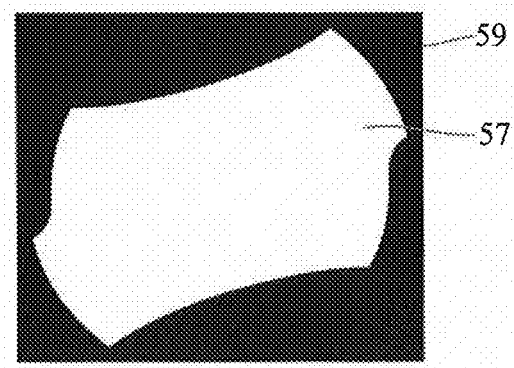
Figure 7E:
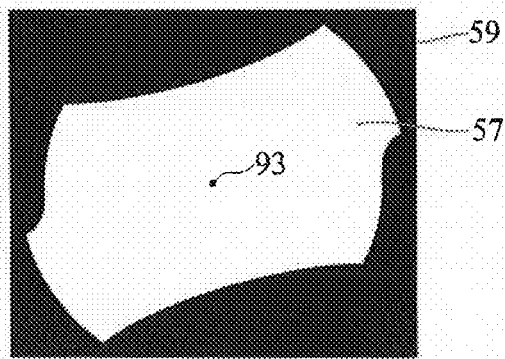
Figure 7F:
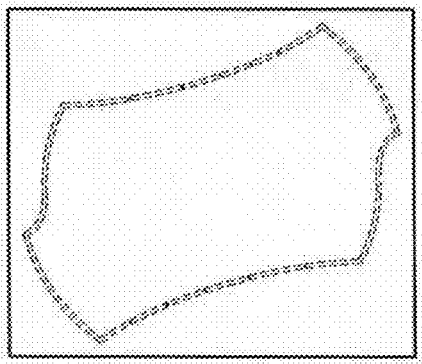
Figure 7G:
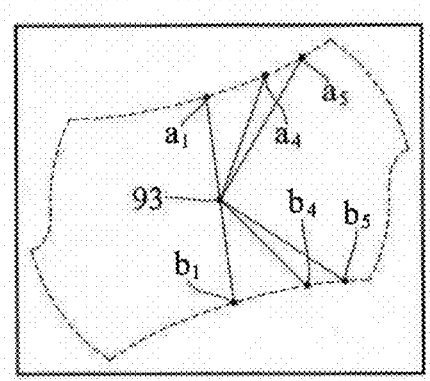
Figure 7H:
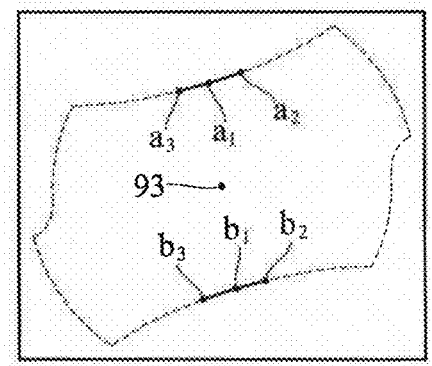
Figure 7I:
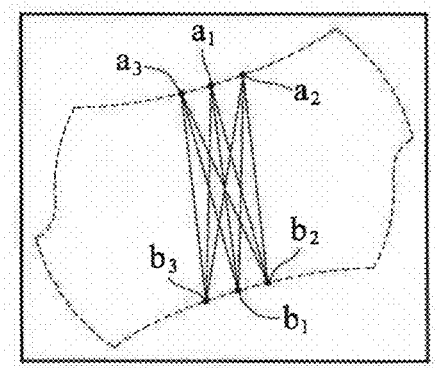

Refer to FIG. 79 to FIG. 7I, wherein FIG. 7B to FIG. 7I are schematic views of the image computing procedure in step 320 according to an embodiment. In FIG. 7B, the computer 201 may employ the control processing module 256 to adjust the brightness, contrast and gamma values of the second image. Then, the control processing module 256 may perform a thresholding operation on the second image to distinguish the axial cross-section 57 from the background 59. For example, as shown in FIG. 7C, the background 59 and the axial cross-section 57 in the second image respectively become black and white. Because the result of the thresholding operation may have some errors, the control processing module 256 may further perform a morphological operation on the second image to eliminate noises, i.e. white points, from the background 59 and compensate holes, i.e. black points, of the axial cross-section 57 in the second image as shown in FIG. 7D. After the morphological operation, the control processing module 256 may perform a computing procedure on the axial cross-section 57 in the second image to obtain a centroid 93 of the axial cross-section 57 as shown in FIG. 7E.

Hereinafter, FIG. 7F to FIG. 7I are schematic views of the steps of the image computing procedure, and the relative operation of the image computing procedure shown in FIG. 7F to FIG. 7I may be based on data rather than images. Thus, FIG. 7F to FIG. 7I are the references to illustrate the steps in the image computing procedure, but do not limit the disclosure.

As shown in FIG. 7F, the control processing module 256 may perform an edge detection procedure on the second image to obtain a plurality of edge contour points of the axial cross-section 57. The edge contour points form a dotted line boundary shown in FIG. 7F. For example, the edge detection procedure is the Roberts cross-gradient operator for detecting edges.

The computer 201 may calculate a first distance between each of the edge contour points, e.g. the edge contour points $a_1$, $a_4$, $a_5$, $b_1$, $b_4$, $b_5$, and the centroid 93 as shown in FIG. 7G, and compare the first distances with each other to select some edge contour points corresponding to the first distances smaller than a specific value, thereby obtain a first flute contour area and a second flute contour area. For example, this first flute contour area is a curve formed by the first edge contour points $a_1$, $a_2$ and $a_3$ corresponding the first distances smaller than the specific value, and this second flute contour area is a curve formed by the second edge contour points $b_1$, $b_2$ and $b_3$ corresponding to the first distances smaller than the specific value, as shown in FIG. 7H. For example, this specific value is 1.25 times the minimum of all of the first distances.

Then, the control processing module 256 may calculate a second distance between each of the first edge contour points $a_1$, $a_2$ and $a_3$ in the first flute contour area and each of the second edge contour points $b_1$, $b_2$ and $b_3$ in the second flute contour area as shown in FIG. 7I, compare the second distances with each other, and select the minimum of the second distances to be an image-based web thickness whose unit is pixel.

Finally, the control processing module 256 may convert the image-based web thickness (i.e. convert an image-based distance to a corresponding physical quantity) to obtain the web thickness whose unit may be physical length.

Additionally, in one or more of the embodiments, the image computing procedure as shown in FIG. 7B to FIG. 7I may be applied to a ST type drill. In one or more of the embodiments, the image computing procedure may be applied to a ST type drill and a UC type microdrill at the same time.

Figure 8B:
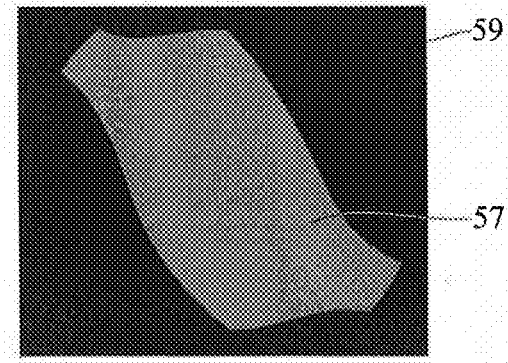
FIG. 8B to FIG. 8L are schematic views of the image computing procedure in step 320 according to an embodiment.
Figure 8C:
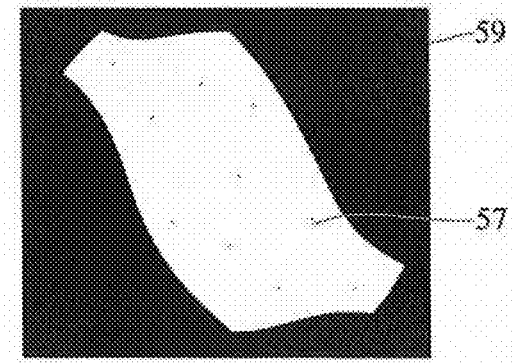
Figure 8D:
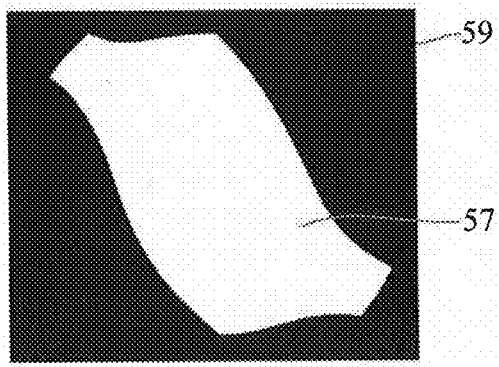
Figure 8E:
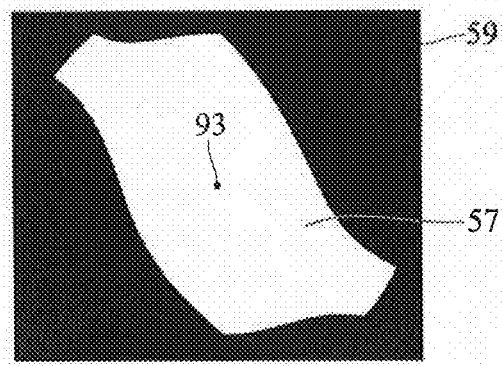
Figure 8F:
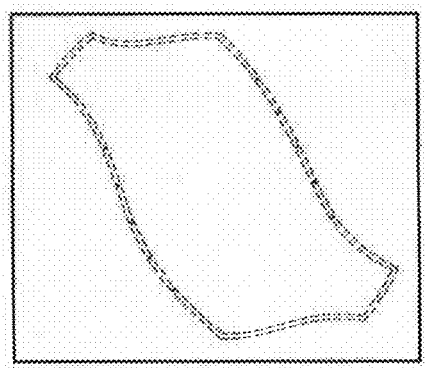
Figure 8G:
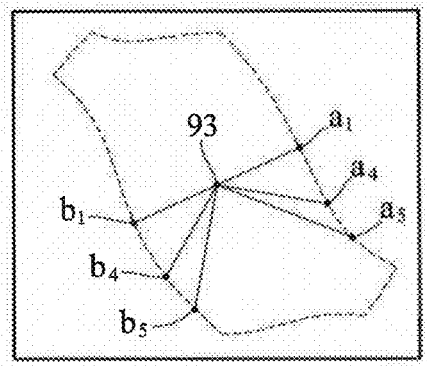
Figure 8H:
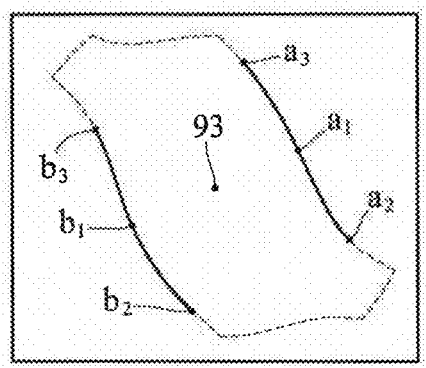
Figure 8I:
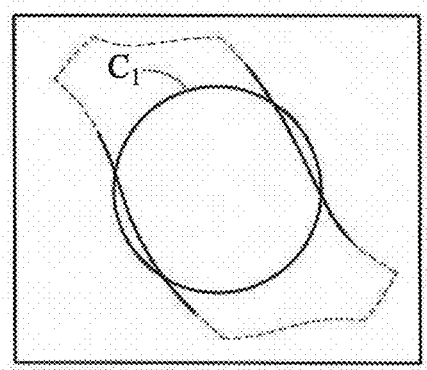
Figure 8J:
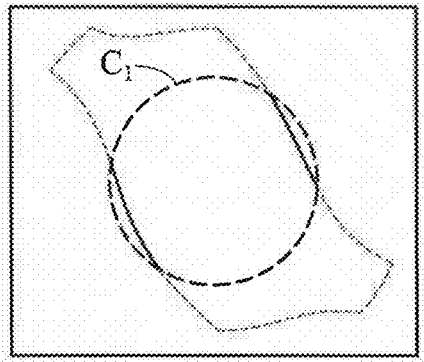
Figure 8K:
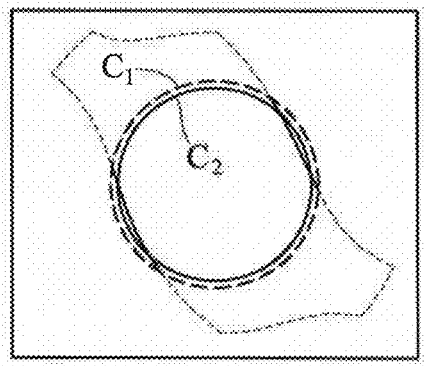
Figure 8L:
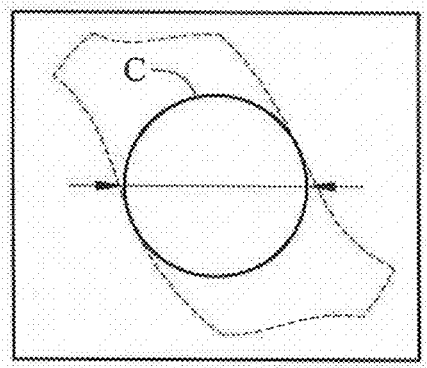
Figure 8M:
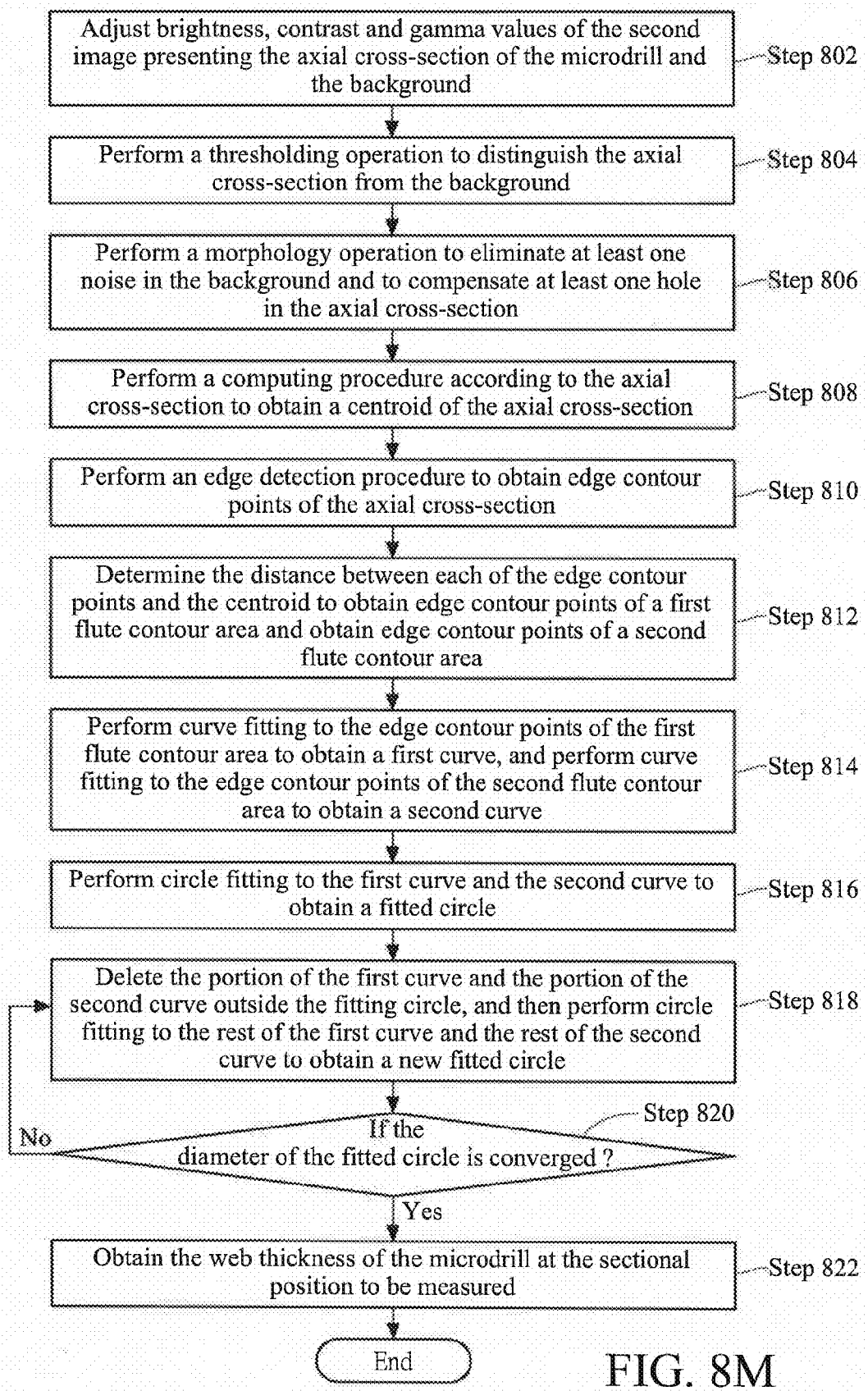
FIG. 8M is a flow chart of the image computing procedure in step 320 according to an embodiment.

Refer to FIG. 8A to FIG. 8M, wherein FIG. 8A is a schematic view of the second image in step 318 according to an embodiment, FIG. 8B to FIG. 8L are schematic views for the image computing procedure in step 320 according to an embodiment, and FIG. 8M is a flow chart of the image computing procedure in step 320 according to an embodiment. In FIG. 8M, the image computing procedure is applied to the microdrill 50 whose type may be ST type or UC type, and may include the following steps.

As shown in step 802, in FIG. 8B, the brightness, contrast and gamma values of the second image may be adjusted, and the second image may present the axial cross-section 57 of the microdrill 50 and the background 59. As shown in step 804, in FIG. 8C, a thresholding operation is performed to distinguish the axial cross-section 57 from the background 59. As shown in step 806, in FIG. 8D, a morphological operation may be performed to eliminate at least one noise in the background 59 and compensate at least one hole in the axial cross-section 57. As shown in step 808, a computing procedure may be performed according to the axial cross-section 57 to obtain a centroid 93 of the axial cross-section 57 shown in FIG. 8E. As shown in step 810, an edge detection procedure is performed to obtain a plurality of edge contour points of the axial cross-section 57 shown in FIG. 8F. As shown in step 812, the distance between each of the edge contour points and the centroid 93 may be determined to obtain a plurality of edge contour points of a first flute contour area and obtain a plurality of edge contour points of a second flute contour area as shown in FIG. 8G and FIG. 8H. The determination of the distance between each of the edge contour points and the centroid 93 can be referred to the relative description in FIG. 7G and FIG. 7H.

As shown in step 814, curve fitting is performed to the edge contour points of the first flute contour area to obtain a first curve which is located between the edge contour points $a_2$ and $a_3$ shown in FIG. 8H, and curve fitting is also performed to the edge contour points of the second flute contour area to obtain a second curve which is located between the edge contour points $b_2$ and $b_3$ shown in FIG. 8H.

As shown in step 816, circle fitting is performed to the first curve and the second curve to obtain a fitted circle. For example, the circle fitting is a least-squares circle-fitting method, and this fitted circle is like the fitted circle $C_1$ in FIG. 8I and covers the partial first curve and the partial second curve.

As shown in step 818, the portion of the first curve and the portion of the second curve outside the fitted circle, e.g. the fitted circle $C_1$ in FIG. 8J, are deleted, and circle fitting, e.g. the least-squares circle-fitting method, is further performed on the rest of the first curve and the rest of the second curve to obtain a new fitted circle, e.g. a fitted circle $C_2$ in FIG. 8K. In other words, the circle fitting is performed to the portion of the first curve and the portion of the second curve inside the fitted circle in step 816. Therefore, the new fitted circle, i.e. the fitted circle $C_2$, may be smaller than the previous fitted circle, i.e. the fitted circle $C_1$, and may cover the partial first curve and the partial second curve.

As shown in step 820, whether the diameter of the fitted circle is converged is determined. Specifically, to converge the diameter of the fitted circle is based on, for example, to determine whether the absolute difference between the diameter of the fitted circle $C_2$ and the diameter of the fitted circle $C_1$ is smaller than the region of one pixel. If the diameter of the fitted circle has not been converged in a range, the step 818 may be repeated. If the diameter of the fitted circle is converged in the range, a best-fitted circle may be obtained, such as a fitted circle C in FIG. 8L.

As shown in step 822, the web thickness 62 of the microdrill 50 at the sectional position to be measured D is obtained according to the diameter of the best-fitted circle in FIG. 8L. For a ST type drill, the best-fitted circle may sufficiently be close to a minimum common tangent circle of the contours of the two helical flutes. For a UC type microdrill, the best-fitted circle may sufficiently be close to a maximum common tangent circle of the contours of the two helical flutes. Therefore, such a best-fitted circle may be very suitable to be used in the measurement of the web thickness 62.

Figure 9:
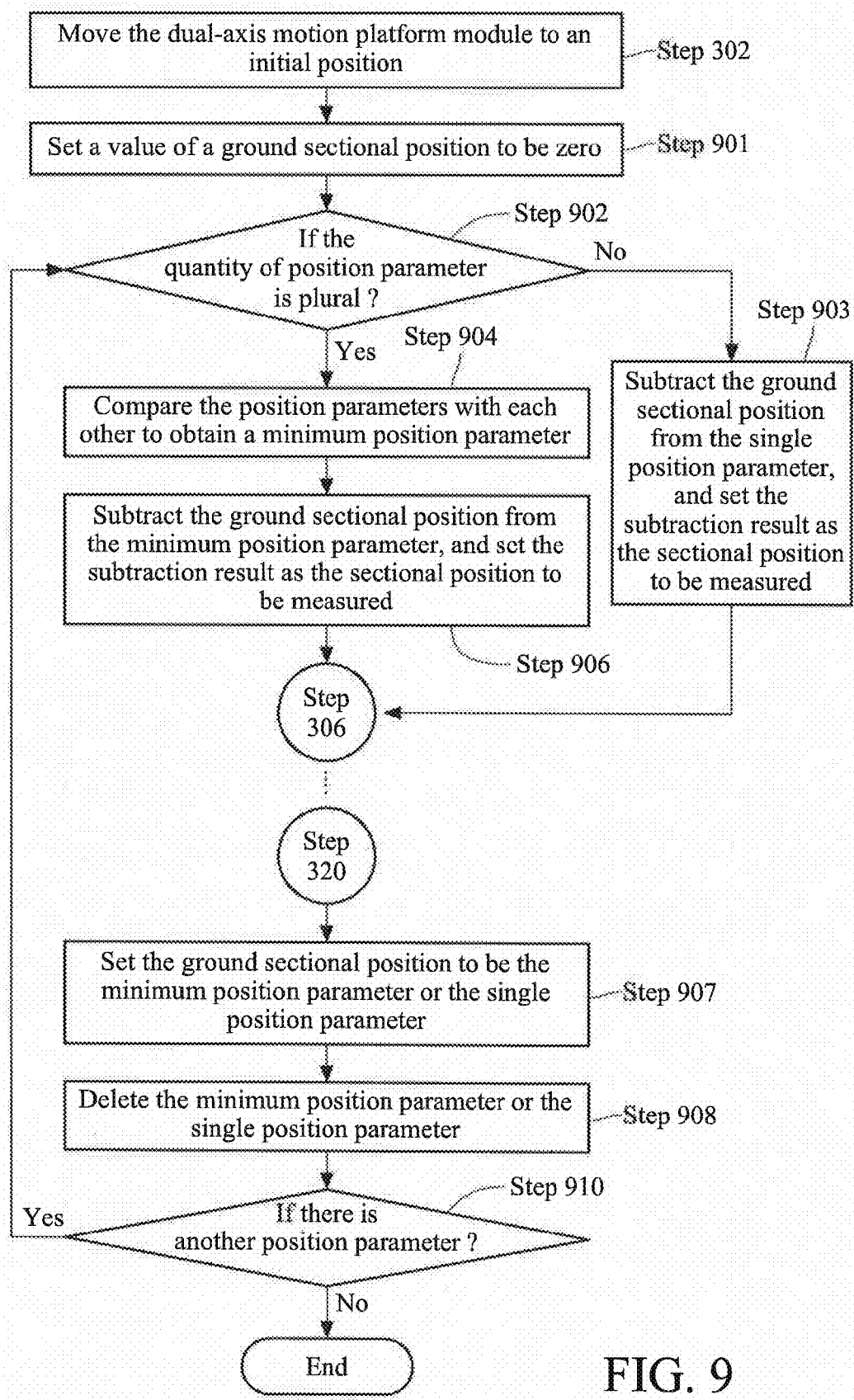
FIG. 9 is a flow chart of a measurement method performed by the measurement automation system in FIG. 2A according to an embodiment.

According to one or more embodiments in the disclosure, the quantity of position parameter is single or plural. FIG. 9 is a flow chart of an improved destructive and visual measurement method performed by the measurement automation system in FIG. 2A according to an embodiment. This measurement method in FIG. 9 may include the steps in FIG. 3, and all the details are described below.

Follow the step 302, the step 304 may include the following steps. First, as shown in step 901, a value of a ground sectional position is set to be 0, and as shown in step 902, whether the quantity of the position parameter is plural or single is determined. When the quantity of position parameter is single, the ground sectional position may be subtracted from the single position parameter, and the subtraction result may be set as the sectional position to be measured as shown in step 903. In contrast, when the quantity of position parameter is plural, these position parameters may be compared with each other to obtain a minimum position parameter in the position parameters as shown in step 904. Then, as shown in step 906, the ground sectional position may be subtracted from the minimum position parameter, and the subtraction result may be set as the sectional position to be measured D. After the step 903 or the step 906, the measurement method proceeds to the step 306.

Moreover, after the step 320, the measurement method may further include the following steps. First, as shown in step 907, the ground sectional position may be set to be the minimum position parameter or the single position parameter. Then, as shown in step 908, the minimum position parameter or the single position parameter may be deleted. Finally, as shown in step 910, whether there is another position parameter is determined. When there is another position parameter, the measurement method may return to the step 902. In contrast, when there is not another position parameter, the measurement method may end.

Therefore, the above measurement method in FIG. 9 can be applied to automatically measure the web thickness 62 of the microdrill 50 at different sectional positions to be measured.

The following shows practical experimental results based on a prototype developed according to the above embodiments. Two series of experiments were conducted.

In the first series of experiments, a ST type microdrill (with a nominal diameter of 0.3 mm and a nominal flute length of $l_f$=5.5 mm) was ground to a sectional position to be measured of D=0.1 $l_f$=0.55 mm, and then its cross-sectional web thickness was repeatedly measured for 12 times. The ST type microdrill was removed from and re-put to the microdrill fixture manually whenever the focusing for the cross-section of the ST type microdrill and the image measurement of the web thickness was performed once. Similarly, a UC type microdrill (with a nominal diameter of 0.25 mm and a nominal flute length of $l_f$=3.9 mm) was ground to a sectional position to be measured of D=0.25 $l_f$=0.975 mm, and then its cross-sectional web thickness was repeatedly measured for 12 times. The UC type microdrill was also removed from and re-put to the microdrill fixture manually whenever the focusing for the cross-section of the UC type microdrill and the image measurement of the web thickness was performed once. Finally, a measuring microscope was employed to measure the cross-sectional web thickness of each microdrill for 12 times for a comparison purpose. The measuring microscope, combined with its image measuring software, has a measuring accuracy of ±3 μm.

Table 1 presents the measurement results of the ST type microdrill, and Table 2 presents the measurement results of the UC type microdrill. In view of Table 1, the repeatability (defined by ±3 times of a standard deviation of the 12 measured data) of the presented method (as referred to FIG. 8) was within a range of ±1.15 μm, and the maximum difference between the measurement data of the presented method and the measuring microscope was 2.16 μm [i.e., the absolute difference between the value of measurement #12 by the presented method (110.39 μm) and the value of measurement #8 by the measuring microscope (112.55 μm)]. In view of Table 2, the repeatability of the presented method (as referred to FIG. 8) was within a range of ±1.4 μm, and the maximum difference between the measurement data of the presented method and the measuring microscope was 2.29 μm [i.e., the absolute difference between the value of measurement #5 by the presented method (135.58 μm) and the value of measurement #5 by the measuring microscope (133.29 μm)]. Therefore, a conservatively evaluated repeatability of ±1.5 μm and a conservatively evaluated accuracy of 2.5 μm could be achieved by the measurement automation system 200.

TABLE 1

| Measurement # | Web thickness obtained by the presented method (μm) | Web thickness obtained by a measuring microscope (μm) |
| --- | --- | --- |
| 1 | 111.14 | 112.03 |
| 2 | 111.70 | 111.03 |
| 3 | 111.73 | 112.11 |
| 4 | 111.58 | 110.24 |
| 5 | 111.06 | 111.35 |
| 6 | 111.05 | 112.42 |
| 7 | 111.57 | 110.55 |
| 8 | 110.90 | 112.55 |
| 9 | 111.16 | 110.70 |
| 10 | 111.26 | 110.37 |
| 11 | 111.26 | 111.30 |
| 12 | 110.39 | 110.85 |
| Average | 111.23 | 111.29 |
| Standard deviation | 0.383 | 0.809 |
| Repeatability | ±1.149 | ±2.426 |

TABLE 2

| Measurement # | Web thickness obtained by the presented method (μm) | Web thickness obtained by a measuring microscope (μm) |
| --- | --- | --- |
| 1 | 134.30 | 134.68 |
| 2 | 134.21 | 134.79 |
| 3 | 134.22 | 134.88 |
| 4 | 134.91 | 133.90 |
| 5 | 135.58 | 133.29 |
| 6 | 134.84 | 135.02 |
| 7 | 134.06 | 133.86 |
| 8 | 134.81 | 134.19 |
| 9 | 135.12 | 134.86 |
| 10 | 135.16 | 134.10 |
| 11 | 134.61 | 133.92 |
| 12 | 134.51 | 134.83 |
| Average | 134.69 | 134.36 |
| Standard deviation | 0.459 | 0.553 |
| Repeatability | ±1.378 | ±1.658 |

Figure 10:
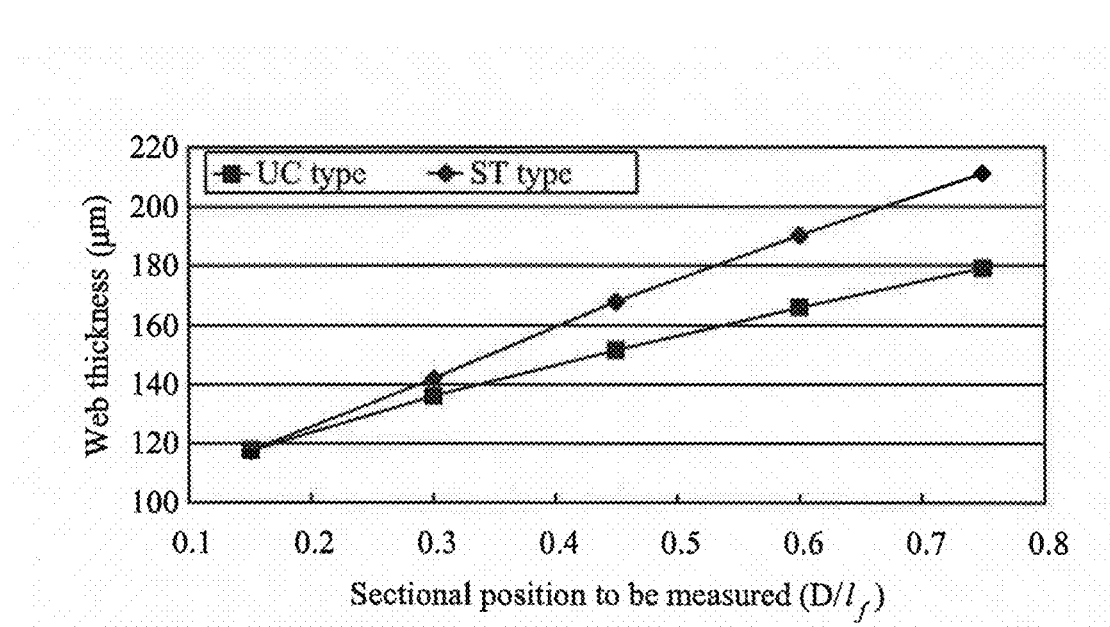
FIG. 10 is a plot of measurement results (averages) of web thicknesses with respect to five specified sectional positions of a ST type microdrill and a UC type microdrill.

In the second series of experiments, a ST type microdrill (with a nominal diameter of 0.3 mm and a nominal flute length of $l_f$=5.5 mm) and a UC type microdrill (with a nominal diameter of 0.25 mm and a nominal flute length of $l_f$=3.9 mm) were sequentially ground and measured at five specified sectional positions to be measured of D=0.15 $l_f$, 0.3 $l_f$, 0.45 $l_f$, 0.6 $l_f$, and 0.75 $l_f$, such experiments are adopted by certain microdrill manufacturers for their quality management tasks. Table 3 and FIG. 10 present the measurement results (averages) of the web thicknesses of the five sectional positions of the two microdrills. In view of Table 3 and FIG. 10, the web thicknesses appear linear and progressively-increasing trends with the increased sectional positions, which agree with the design of a taper of the drill web 56 as shown in FIG. 1B.

TABLE 3

| Sectional position to be measured D | Web thickness of a ST type microdrill (μm) | Web thickness of a UC type microdrill (μm) |
| --- | --- | --- |
| 0.15$l_f$ | 117.69 | 117.73 |
| 0.30$l_f$ | 142.32 | 135.71 |
| 0.45$l_f$ | 167.94 | 151.49 |
| 0.60$l_f$ | 190.62 | 166.08 |
| 0.75$l_f$ | 211.26 | 178.68 |

As set forth above, the measurement automation system and the measurement method in the disclosure can automatically measure the web thickness of the microdrill at the sectional position to be measured. After the vision module can receive the second light beam reflected by the reflection module, the measurement automation system in the positioning procedure and the grinding procedure may efficiently check whether the drill grinding module grinds the microdrill to the sectional position to be measured, thereby effectively reducing the cost of the measurement automation system. Through the vision module cooperating with the image computing procedure, the disclosure may increase the stability of measurement and be able to be applied to microdrills of different types. Moreover, through the computer, the disclosure may efficiently monitor the measurement procedure for measuring the microdrill.

What is claimed is:
1. An improved destructive and visual measurement automation system for measuring a web thickness of a microdrill, comprising:
a computer;

a dual-axis motion platform module, electrically connected to the computer and configured to hold the microdrill and be controlled by the computer to move the microdrill;

a drill grinding module, electrically connected to the computer and configured to grind the microdrill to a sectional position to be measured to form an axial cross-section of the microdrill when the dual-axis motion platform module moves the microdrill to a grinding position;

a reflection module, configured to reflect a first image, which presents a drill tip of the microdrill and the drill grinding module, in a first direction toward a second direction when the dual-axis motion platform module moves the microdrill to a first position at which the microdrill does not contact with the drill grinding module; and a vision module, electrically connected to the computer, wherein when the vision module acquires the reflected first image in the second direction and outputs the acquired first image to the computer, the computer obtains a first distance between the drill grinding module and the drill tip of the microdrill according to the acquired first image; and then when the dual-axis motion platform module moves the microdrill to a second position at which the microdrill is in an image capture region of the vision module, the vision module acquires a second image, presenting the axial cross-section of the microdrill at the sectional position to be measured, in the second direction and outputs the second image to the computer, and the computer calculates the web thickness of the microdrill at the sectional position to be measured according to the second image;

wherein the computer controls the drill grinding module according to the first distance and the sectional position to be measured to grind the microdrill to the sectional position to be measured.

2. The improved destructive and visual measurement automation system according to claim 1, wherein the dual-axis motion platform module comprises:

a drill fixture, configured to hold the microdrill;

a longitudinal motion unit, configured to move the drill fixture along a longitudinal axis; and a traverse motion unit, configured to move the drill fixture along a transversal axis which is perpendicular to the longitudinal axis.

3. The improved destructive and visual measurement automation system according to claim 1, wherein the drill grinding module comprises an induction motor, a transmission unit, and a grinding wheel, and the computer controls the induction motor to rotate the grinding wheel through the transmission unit, to grind the microdrill to the sectional position to be measured.

4. The improved destructive and visual measurement automation system according to claim 1, wherein the reflection module comprises:

a first light source, configured to generate a first light beam in the first direction;

a reflector, configured to move in synchronism with the dual-axis motion platform module, a magnification adjusting objective, located between the first light source and the reflector, and configured to move in synchronism with the dual-axis motion platform module; and wherein the first light beam passes through the magnification adjusting objective and then is reflected by the reflector to be a second light beam in the second direction, and the direction of the first light beam projected on the reflector is perpendicular to the second direction; and when the dual-axis motion platform module moves the microdrill to the first position, the vision module receives the second light beam from the reflector to output the first image to the computer.

5. The improved destructive and visual measurement automation system according to claim 1, wherein the vision module comprises:

a second light source, configured to generate a third light beam which is projected on the axial cross-section of the microdrill at the sectional position to be measured to form reflected light beam in the second direction when the dual-axis motion platform module moves the microdrill to the second position;

a lens whose optic axis is parallel to a central axis of the microdrill; and an image sensor, configured to receive the reflected light beam to output the second image to the computer after the reflected light beam passes through the lens.

6. An improved destructive and visual measurement method for measuring a web thickness of a microdrill, comprising:

setting a position parameter which specifies a sectional position to be measured of the microdrill;

moving the microdrill to a first position at which the microdrill does not contact with a drill grinding module;

performing focusing for the drill grinding module;

reflecting a first image, which presents the drill grinding module and a drill tip of the microdrill, in a first direction toward a second direction via a reflection module;

acquiring the reflected first image in the second direction;

performing a positioning procedure according to the first image to obtain a first distance between the microdrill and the drill grinding module;

performing a grinding procedure according to the first distance and the sectional position to be measured to control the drill grinding module to grind the microdrill to the sectional position to be measured to form an axial cross-section of the microdrill;

moving the microdrill to a second position;

performing focusing for the axial cross-section of the microdrill at the sectional position to be measured;

acquiring a second image, which presents a background and an axial cross-section of the microdrill, in the second direction;

adjusting brightness, contrast and gamma values of the second image;

performing a thresholding operation to distinguish the axial cross-section from the background;

performing a morphological operation to eliminate at least one noise in the background and compensate at least one hole in the axial cross-section in the second image;

performing a computing procedure according to the axial cross-section to obtain a centroid of the axial cross-section;

performing an edge detection procedure to obtain a plurality of edge contour points of the axial cross-section;

obtaining a plurality of edge contour points of a first flute contour area and a plurality of edge contour points of a second flute contour area by determining a distance between each edge contour point of the axial cross-section and the centroid of the axial cross-section;

performing curve fitting to the edge contour points of the first flute contour area to obtain a first curve, and performing curve fitting on the edge contour points of the second flute contour area to obtain a second curve;

performing circle fitting to the first curve and the second curve to obtain a fitted circle;

deleting a part of the first curve and a part of the second curve outside the fitted circle and performing circle fitting to the rest of the first curve and the rest of the second curve, until a diameter of the fitted circle is converged to be an best-fitted circle; and obtaining the web thickness of the microdrill at the sectional position to be measured according to the diameter of the best-fitted circle.

7. The improved destructive and visual measurement method according to claim 6, wherein the positioning procedure comprises:

obtaining a drill end surface of the microdrill and a grinding wheel end surface of the drill grinding module according to the first image;

calculating a plurality of longitudinal distances between the drill end surface and the grinding wheel end surface; and comparing the longitudinal distances with each other to obtain the first distance.

8. The improved destructive and visual measurement method according to claim 6, wherein the grinding procedure comprises;

driving the drill grinding module via a grinding wheel switch sub-module;

moving the microdrill to proceed a specific distance toward the drill grinding module, and grinding the microdrill to the sectional position to be measured via the drill grinding module, wherein the specific distance is related to the position parameter and the first distance; and moving the microdrill away from the drill grinding module.

9. The improved destructive and visual measurement method according to claim 6, wherein to set the position parameter comprises:

setting a ground sectional position as zero;

determining whether a quantity of the position parameter is plural;

setting the sectional position to be measured by subtracting the ground sectional position from the position parameter when the quantity of the position parameter is not plural; and comparing the position parameters with each other to obtain a minimum position parameter in the position parameters and then setting the sectional position to be measured by subtracting the ground sectional position from the minimum position parameter when the quantity of the position parameter is plural.

10. The improved destructive and visual measurement method according to claim 9, further comprising the following steps after the image computing procedure is performed according to the second image to obtain the web thickness of the microdrill at the sectional position to be measured:

setting the ground sectional position to be equal to the minimum position parameter or the single position parameter;

deleting the minimum position parameter or the single position parameter;

determining whether there is another position parameter; and continuing determining whether the quantity of the position parameter is plural, when there is another position parameter.

* * * * *